United States Patent
Takahashi et al.

(10) Patent No.: US 9,297,991 B2
(45) Date of Patent: Mar. 29, 2016

(54) LIGHTING METHOD AND MICROSCOPIC OBSERVATION DEVICE

(71) Applicants: THE UNIVERSITY OF TOKYO, Tokyo (JP); NATIONAL UNIVERSITY CORPORATION SHIZUOKA UNIVERSITY, Shizuoka-shi, Shizuoka (JP)

(72) Inventors: Satoru Takahashi, Tokyo (JP); Kiyoshi Takamasu, Musashino (JP); Ryota Kudo, Minoh (JP); Shin Usuki, Hamamatsu (JP)

(73) Assignees: THE UNIVERSITY OF TOKYO, Tokyo (JP); NATIONAL UNIVERSITY CORPORATION SHIZUOKA UNIVERSITY, Shizuoka (JP)

( * ) Notice: Subject to any disclaimer, the term of this patent is extended or adjusted under 35 U.S.C. 154(b) by 1 day.

(21) Appl. No.: 14/380,785

(22) PCT Filed: Feb. 25, 2013

(86) PCT No.: PCT/JP2013/054821
§ 371 (c)(1),
(2) Date: Aug. 25, 2014

(87) PCT Pub. No.: WO2013/125723
PCT Pub. Date: Aug. 29, 2013

(65) Prior Publication Data
US 2015/0043049 A1 Feb. 12, 2015

(30) Foreign Application Priority Data
Feb. 24, 2012 (JP) .................... 2012-039261

(51) Int. Cl.
*G02B 21/00* (2006.01)
*G02B 26/00* (2006.01)
(Continued)

(52) U.S. Cl.
CPC ............... *G02B 21/06* (2013.01); *G02B 21/14* (2013.01); *G02B 21/26* (2013.01); *G02F 1/01* (2013.01); *G02B 27/58* (2013.01); *G02B 27/60* (2013.01)

(58) Field of Classification Search
CPC ...................................................... G02B 27/58
USPC ................. 359/368, 370, 382, 385, 656, 738; 348/79
See application file for complete search history.

(56) References Cited

U.S. PATENT DOCUMENTS 9,170,411 B2 * 10/2015 Matsuzaki ......... G02B 21/0032
2012/0274931 A1 11/2012 Otani et al.

FOREIGN PATENT DOCUMENTS

JP   A-08-313433    11/1996
JP   A-2005-322754  11/2005
(Continued)

OTHER PUBLICATIONS
International Search Report issued in International Application No. PCT/JP2013/054821 dated May 21, 2013.
(Continued)

*Primary Examiner* — Tuyen Tra
(74) *Attorney, Agent, or Firm* — Oliff PLC

(57) ABSTRACT

Standing wave-generating planar wave illumination units generate two light-wave planar waves using light from a light source assembly and irradiate a sample surface with a standing wave produced by interference of the planar waves on the sample surface. A bias planar wave illumination unit generates a bias planar wave using light from the light source assembly and irradiates the sample surface with the wave. The bias planar wave is synchronized with the standing wave to alternately oscillate to positive and negative with an equal electric field displacement irrespective of the position on the sample surface across a reference time specified in advance when the displacement of the standing wave has a value "0" at the respective positions on the sample surface, and oscillates at a bias amplitude specified in advance to raise the displacement of the standing wave on the sample surface to only a positive or negative displacement.

18 Claims, 17 Drawing Sheets

(51) Int. Cl.
  *G02B 21/06* (2006.01)
  *G02B 21/26* (2006.01)
  *G02F 1/01* (2006.01)
  *G02B 21/14* (2006.01)
  *G02B 27/60* (2006.01)
  *G02B 27/58* (2006.01)

(56) References Cited

FOREIGN PATENT DOCUMENTS

| JP | A-2007-225563 | 9/2007 |
| JP | A-2011-106974 | 6/2011 |

OTHER PUBLICATIONS

Oct. 19, 2015 Extended European Search Report issued in European Patent Application No. 13751843.7.

Gustafsson, Mats G.L., et al. "Three-Dimensional Resolution Doubling in Wide-Field Fluorescence Microscopy by Structured Illumination." Biophysical Journal. vol. 94, pp. 4957-4970, 2008.

* cited by examiner

Fig. 15

|  | Example 1 | Example 2 | Example 3 |
|---|---|---|---|
| Amplitude A | 1.0 | 1.0 | 1.0 |
| Reflectivity r1 | 0.4 | 0.75 | 0.3 |
| Reflectivity r2 | 0.4 | 0.75 | 0.3 |
| Reflectivity r3 | 0.2 | 0.55 | 0.2 |
| Phase Difference $\delta_1$ | 3.14 | 3.14 | 1.57 |
| Phase Difference $\delta_2$ | 3.14 | 3.14 | 1.57 |
| Phase Difference $\delta_3$ | 3.14 | 3.14 | 3.14 |
|  | ⇩ | ⇩ | ⇩ |
| Corrected Amplitude P | 1.5 | 1.1 | 2.6 |
| Phase Correction Amount $\Delta D$ | 0 | 0 | 0.28 |

LIGHTING METHOD AND MICROSCOPIC OBSERVATION DEVICE

TECHNICAL FIELD

The present invention relates to a lighting method and a microscopic observation device. More specifically, the invention relates to a lighting method employed in a microscopic observation device configured to resolve a sample surface of a sample to be microscopically observed based on a light intensity distribution from the sample surface, as well as to a microscopic observation device using such a lighting method.

BACKGROUND ART

One proposed configuration of a high resolution detection device consisting of a microscopic observation device (e.g., optical microscope) using this type of lighting method and a computer includes: a light source configured to radiate laser light; a projection optical system comprised of, for example, a lens, a beam splitter, a plurality of reflector mirrors, a piezoelectric element and a prism and configured to divide the light flux from the light source and make interference of two reflected light fluxes on a sample surface and thereby irradiate the sample surface with a standing wave; an observation optical system configured to cause the light flux from the sample surface to be transmitted through a lens such as objective lens and received by a light-receiving element such as CCD; and a computer configured to input and analyze the light receiving quantity measured by the light-receiving element while shifting the standing wave illumination in nanometer order a plurality of times by actuation of one reflector mirror by the piezoelectric element, so as to perform super-resolution (see, for example, Patent Literature 1).

This high resolution detection device employs the following algorithm as a super-resolution process by the computer: providing n×m simultaneous equations obtained by shifting standing wave illumination m times with respect to n light receiving quantities of, for example, CCDs, as fundamental equations for super-resolution and solving these equations with an intensity Ij of illumination light (illumination light quantity) and a diffraction contribution ratio D (|i−j|) at a position Aj (j=1 to n) on a sample surface so as to determine a scattering efficiency αj. This device allows for resolution exceeding the Rayleigh limit by post-process of a light scattering change in nanometer order by the computer.

CITATION LIST

Patent Literature

Patent Literature 1: Japanese Patent Laid-Open No.

SUMMARY OF THE INVENTION

Microscopic observation devices such as optical microscopes are generally dominant by the physical diffraction limit. There is accordingly a difficulty in observing the structure equal to or less than about half wavelength of light. The microscopic observation devices such as optical microscopes, on the other hand, have excellent characteristics, for example, unnecessary for vacuum environment, less-invasive, and high speed, unlike other microscopic observation devices such as electron microscopes and atomic force microscopes. There is accordingly a high need to exceed the diffraction limit. Upon such need, a device that performs super-resolution using the structural illumination with the standing wave, such as the high resolution detection device described above, can advantageously exceed the diffraction limit by the relatively simple configuration.

In the device that performs super-resolution using the structural illumination with the standing wave, such as the high resolution detection device described above, however, the object of the super-resolution process is limited to only special samples, such as fluorescent samples, which are capable of incoherent imaging using even a coherent light source. There is accordingly a problem that the super-resolution process is not widely applied to general samples. More specifically, the super-resolution technique described above preferably uses a coherent light source such as laser light, since this needs generation of the brighter and the more sensitive structural illumination to maximize the resolution. Reconfiguration operations by the computer are generally needed for image formation. The super-resolution technique is thus effectively applicable to only incoherent imaging which forms an image not by destructive interference but by intensity sum.

The lighting method and the microscopic observation device of the invention mainly aim to expand the range of application of a super-resolution process using light wave information from a sample surface.

The Lighting method and microscopic observation device of the invention employ the following aspects and embodiments, in order to achieve the above object.

According to one aspect, the present invention is directed to a lighting method employed for a microscopic observation device configured to resolve a sample surface of a sample to be microscopically observed, based on a light intensity distribution from the sample surface. The lighting method includes irradiating the sample surface with two light-flux standing wave obtained by radiating two light-flux planar waves, which are produced from light emitted from a light source assembly, from oblique directions to be opposed to each other, while irradiating the sample surface with a bias planar wave obtained by adjusting amplitude and phase of one light-flux planar wave, which is produced from the light emitted from the light source assembly, from a direction normal to the sample surface, so as to irradiate the sample surface with three light-flux standing wave.

The lighting method of this aspect irradiates the sample surface with the two light-flux standing wave obtained by radiating the two light-flux planar waves, which are produced from the light emitted from the light source assembly, from the oblique directions to be opposed to each other, while irradiating the sample surface with the bias planar wave obtained by adjusting the amplitude and the phase of the one light-flux planar wave, which is produced from the light emitted from the light source assembly, from the direction normal to the sample surface, so as to irradiate the sample surface with the three light-flux standing wave. The bias planar wave has the amplitude to raise an electric field displacement of another light wave group present on the sample surface to positive or to negative. Irradiation of the sample surface with the three light-flux standing wave consisting of the two light-flux standing wave and the bias planar wave raises electric field displacements of reflected light and scattered light from the sample surface to a positive displacement or to a negative displacement. This suppresses pieces of light wave information from the sample surface from cancelling out each other and causes a super-resolution process not to be limited to fluorescent samples but to be applied to general samples. This accordingly expands the range of application of the super-resolution process using the light wave information from the sample surface. The "super-resolution" herein means obtaining a clear image of an object in detail through an optical system and may be translated as high-resolution or more specifically as resolution beyond the diffraction limit in an observation optical system.

In the lighting method of the above aspect, the bias planar wave may be a planar wave having a phase adjusted to alternately oscillate to positive and to negative with an equal electric field displacement irrespective of position on the sample surface across a reference time specified in advance as a time when an electric field displacement of the two light-flux standing wave has a value "0" at respective positions on the sample surface, and an amplitude adjusted to raise an electric field displacement of another light wave group present on the sample surface to only a positive displacement or to only a negative displacement. In the case of only the illumination by the two light-flux standing wave, an electric field distribution ranging from the positive to the negative on the sample surface periodically appears in the standing wave. Addition of illumination by the bias planar wave, however, causes an electric field distribution which is raised to only a positive distribution or to only a negative distribution (i.e., raised not to range from the positive to the negative) from the electric field distribution ranging from the position to the negative on the sample surface, to appear periodically. The "reference time" herein may be specified in advance as the time when an electric field displacement of the standing wave is equal to a value "0" or approximately equal to the value "0" at each position on the sample surface or may be specified in advance as the time when an electric field displacement of the sum of an electric field of the standing wave and electric fields of reflected light waves on the sample surface (all the reflected light waves) is equal to the value approximately equal to the value "0" at each position on the sample surface.

In the lighting method of the above aspect, the bias planar wave may have an amplitude adjusted to be equal to amplitude of the two light-flux standing wave, and a phase adjusted to be synchronized with phase of the two light-flux standing wave. This enables the electric field distribution on the sample surface irradiated with the three light-flux standing wave to be just raised to have only a positive distribution or only a negative distribution.

The lighting method of the above aspect may further comprise: repeating a series of processes until number of reference images becomes less than a threshold value, wherein the series of processes include: a process of irradiating the sample surface with the two light-flux standing wave while successively shifting phase of the bias planar wave by each predefined amount until the phase of the bias planar wave reaches $2\pi$, and obtaining a light distribution in each shift which is an intensity distribution of light reflected or scattered from the sample surface; a process of searching Fourier transform images obtained by Fourier transform of the light distributions in the respective shifts, for any reference image where only a peak derived from a moire fringe based on the three light-flux standing wave is observed, wherein the peak derived from the moire fringe based on the three light-flux standing wave has a period that is twice a period of a peak derived from a moire fringe based on the two light-flux standing wave; and a process of increasing amplitude of the bias planar wave when there is no reference image, while decreasing the amplitude of the bias planar wave when the number of the reference images is not less than the threshold value; and setting an amplitude when the number of the reference images becomes less than the threshold value, as an initial amplitude of the bias planar wave, and a phase of the reference image when the number of the reference images becomes less than the threshold value, as an initial phase of the bias planar wave, so as to adjust the three light-flux standing wave which is to be delivered to the sample surface. This readily and automatically enables the electric field distribution on the sample surface irradiated with the three light-flux standing wave to be just raised to have only a positive distribution or only a negative distribution. A reference sample is used for adjustment of the three light-flux standing wave. The reference sample is preferably a line-and-space pattern having a periodical structure to produce, in combination with the standing wave, a moire fringe and having a known line pitch. The three light-flux standing wave is adjusted by using a moire fringe pattern produced by incidence of the three light-flux standing wave to the reference sample.

The lighting method of the above aspect may further comprise successively shifting phase of the two light-flux standing wave in synchronism with phase of the bias planar wave, so as to successively shift phase of the three light-flux standing wave. In this embodiment, the lighting method may further comprise successively shifting phase of one of the planar waves of the two light-flux standing wave by a predetermined phase, while successively shifting phase of the bias planar wave by half the predetermined phase, so as to successively shift the phase of the three light-flux standing wave. Additionally, in this embodiment, the lighting method may further comprise successively changing optical path length of one of the planar waves of the two light-flux standing wave by a predetermined distance, while successively changing optical path length of the bias planar wave by half the predetermined distance, so as to successively shift the phase of the three light-flux standing wave. This enables the phase of the three light-flux standing wave to be shifted successively, while maintaining the synchronism of the phase of the three light-flux standing wave consisting of the two light-flux standing wave and the bias planar wave. This results in obtaining light information of, for example, reflected light and scattered light from the sample surface, while successively shifting the phase of the three light-flux standing wave. Herein "shifting the phase" means moving the positions of nodes of the two light-flux standing wave or the three light-flux standing wave.

The present invention is directed to a microscopic observation device configured to resolve a sample surface of a sample to be microscopically observed, based on a light intensity distribution from the sample surface. The microscopic observation device including:

a light source assembly;

a lighting device having: a two light-flux standing wave illumination unit configured to irradiate the sample surface with two light-flux standing wave obtained by radiating two light-flux planar waves, which are produced from light emitted from a light source assembly, from oblique directions to be opposed to each other; and a bias planar wave illumination unit configured to irradiate the sample surface with a bias planar wave obtained by adjusting amplitude and phase of one light-flux planar wave, which is produced from the light emitted from the light source assembly, from a direction normal to the sample surface, the lighting device being configured to irradiate the sample surface with three light-flux standing wave consisting of the two light-flux standing wave and the bias planar wave;

a light distribution acquirer configured to obtain an intensity distribution of light reflected and/or scattered from the sample surface irradiated with the three light-flux standing wave, as a light distribution;

a shift controller configured to control the lighting device to successively shift phase of the three light-flux standing wave, and to control the light distribution acquirer to obtain the light distribution in each shift of the phase of the three light-flux standing wave; and a resolver configured to perform a super-resolution process for the light distribution obtained in each shift of the phase of the three light-flux standing wave, so as to resolve the sample surface.

In the microscopic observation device of this aspect, the lighting device irradiates the sample surface with the two light-flux standing wave obtained by radiating the two light-flux planar waves, which are produced from the light emitted from the light source assembly, from the oblique directions to be opposed to each other, while irradiating the sample surface with the bias planar wave obtained by adjusting the amplitude and the phase of the one light-flux planar wave, which is produced from the light emitted from the light source assembly, from the direction normal to the sample surface, so as to irradiate the sample surface with the three light-flux standing wave consisting of the two light-flux standing wave and the bias planar wave. The microscopic observation device then successively shifts the phase of the three light-flux standing wave, obtains the light distribution which is the intensity distribution of light reflected or scattered from the sample surface in each shift and performs the super-resolution process for the obtained light distribution in each shift, so as to resolve the sample surface. The bias planar wave has the amplitude to raise an electric field displacement of another light wave group present on the sample surface to positive or to negative. Irradiation of the sample surface with the three light-flux standing wave consisting of the two light-flux standing wave and the bias planar wave raises electric field displacements of reflected light and scattered light from the sample surface to a positive displacement or to a negative displacement. This suppresses pieces of light wave information from the sample surface from cancelling out each other and obtains the light distribution in each shift effective not only for a fluorescent sample but for a general sample to apply the super-resolution process. Herein "shifting the phase" means moving the positions of nodes of the three light-flux standing wave. The "super-resolution" herein means obtaining a clear image of an object in detail through an optical system and may be translated as high-resolution or more specifically as resolution beyond the diffraction limit in an observation optical system.

In the microscopic observation device of the above aspect, the bias planar wave illumination unit may be configured to adjust phase of the bias planar wave to alternately oscillate to positive and to negative with an equal electric field displacement irrespective of position on the sample surface across a reference time specified in advance as a time when an electric field displacement of the two light-flux standing wave has a value "0" at respective positions on the sample surface, and to adjust amplitude of the bias planar wave to raise an electric field displacement of another light wave group present on the sample surface to only a positive displacement or to only a negative displacement. In the case of only the illumination by the two light-flux standing wave, an electric field distribution ranging from the positive to the negative on the sample surface periodically appears in the standing wave. Addition of illumination by the bias planar wave, however, causes an electric field distribution which is raised to only a positive distribution or to only a negative distribution (i.e., raised not to range from the positive to the negative) from the electric field distribution ranging from the position to the negative on the sample surface, to appear periodically. The "reference time" herein may be specified in advance as the time when an electric field displacement of the standing wave is equal to a value "0" or approximately equal to the value "0" at each position on the sample surface or may be specified in advance as the time when an electric field displacement of the sum of an electric field of the standing wave and electric fields of reflected light waves on the sample surface (all the reflected light waves) is equal to the value or approximately equal to the value "0" at each position on the sample surface.

In the microscopic observation device of the above embodiment using the reference time to adjust phase of the bias planar wave, the two light-flux standing wave illumination unit may be configured to radiate the two light-flux planar waves satisfying relationships expressed by Equation (1) and Equation (2) given below, and the bias planar wave illumination unit is configured to radiate the bias planar wave satisfying a relationship expressed by Equation (3) given below, where E1 and E2 represent electric fields of the respective two light-flux planar waves, E3 represents an electric field of the bias planar wave, A represents an amplitude of each of the two light-flux planar waves, the amplitude of the bias planar wave is equal to an amplitude of the two light-flux standing wave, k represents a wave number of each of the two light-flux planar waves and the bias planar wave, θ represents an angle of incidence of the two light-flux planar waves to the sample surface, x represents a position in a direction of intersection between planes of incidence of the two light-flux planar waves and the sample surface, y represents a position in the direction normal to the sample surface, ω represents an angular frequency and t represents a time. This configuration enables the illumination by the bias planar wave to more effectively generate the electric field just raised not to range from the positive to the negative from the electric field distribution ranging from the positive to the negative on the sample surface based on irradiation with the two light-flux standing wave.

$$E1 = A \cdot \sin(-\omega \cdot t + k \cdot \sin\theta \cdot x - k \cdot \cos\theta \cdot y) \quad (1)$$

$$E2 = A \cdot \sin(-\omega \cdot t - k \cdot \sin\theta \cdot x - k \cdot \cos\theta \cdot y) \quad (2)$$

$$E3 = 2 \cdot A \cdot \sin(-\omega \cdot t - k \cdot y) \quad (3)$$

In the lighting device of the above embodiment that radiates the two light-wave planar waves satisfying the relationships expressed by Equations (1) and (2) above and radiates the bias planar wave satisfying the relationship expressed by Equation (3), the bias planar wave illumination unit may radiate the bias planar wave satisfying a relationship expressed by Equation (7) of a corrected electric field E3a, which is obtained by correcting the electric field E3 using a corrected amplitude P and a phase correction amount AD based on relationships expressed by Equations (4) to (6) given below. Here E1r and E2r represent electric fields of respective reflected light waves by reflection of the two light-wave planar waves from the sample surface, r1 and r2 represent reflectivities of the two light-wave planar waves from the sample surface, δ1 and δ2 represent phase differences between the two light-wave planar waves and the respective reflected light waves by reflection of the two light-wave planar waves from the sample surface, E3r represents an electric field of a reflected light wave by reflection of the bias planar wave from the sample surface, r3 represents a reflectivity of the bias planar wave from the sample surface, δ3 represents a phase difference between the bias planar wave and the reflected light wave by reflection of the bias planar wave from the sample surface, P represents a corrected amplitude by correcting the amplitude of the bias planar wave assumed to be equal to amplitude of the two-light flux standing wave, and ΔD represents a phase correction amount by correcting the phase of the bias planar wave. This configuration enables the illumination by the bias planar wave having the corrected amplitude and phase to more effectively generate the electric field just raised not to range from the positive to the negative from the electric field distribution ranging from the positive to the negative on the sample surface based on irradiation with the standing wave, respective reflected light waves of the two light-wave planar waves for generating this standing wave, and a reflected light wave of the bias planar wave.

$$E1r = r1 \cdot A \cdot \sin(-\omega \cdot t + k \cdot \sin\theta \cdot x + k \cdot \cos\theta \cdot y + \delta1) \quad (4)$$

$$E2r = r2 \cdot A \cdot \sin(-\omega \cdot t - k \cdot \sin\theta \cdot x + k \cdot \cos\theta \cdot y + \delta2) \quad (5)$$

$$E3r = P \cdot r3 \cdot \sin(-\omega \cdot t + k \cdot y + \Delta D + \delta3) \quad (6)$$

$$E3a = P \cdot \sin(-\omega \cdot t + k \cdot y + \Delta D) \quad (7)$$

Further in the microscopic observation device according to the above embodiment using the reference time to adjust phase of the bias planar wave, the bias planar wave illumination unit may radiate the bias planar wave using the reference time and the amplitude based on electric field displacements of reflective light waves of the two light-flux planar waves and the bias planar wave from the sample surface. This configuration enables the illumination by the bias planar wave having the corrected amplitude and phase to raise substantially not to range from the positive to the negative from the electric field distribution ranging from the positive to the negative on the sample surface based on irradiation with the standing wave, respective reflected light waves of the two light-wave planar waves for generating this standing wave, and a reflected light wave of the bias planar wave.

The microscopic observation device of the above aspect, the bias planar wave illumination unit may be configured to radiate the bias planar wave having an amplitude adjusted to be equal to amplitude of the two light-flux standing wave and a phase adjusted to be synchronized with phase of the two light-flux standing wave. This enables the electric field distribution on the sample surface irradiated with the three light-flux standing wave to be just raised to have only a positive distribution or only a negative distribution.

The microscopic observation device of the above aspect may further comprise an initial setting unit configured to repeat three controls until number of reference images becomes less than a threshold value and set an amplitude when the number of reference images becomes less than the threshold value, as an initial amplitude of the bias planar wave, and a phase of the reference image when the number of the reference images becomes less than the threshold value, as an initial phase of the bias planar wave. The three controls include: a bias planar wave phase shift control of controlling the illumination device to irradiate the sample surface with the two light-flux standing wave by the two light-flux standing wave illumination unit while successively shifting phase of the bias planar wave by each predetermined amount until the phase of the bias planar wave reaches 2π; a light distribution-in-each-shift obtaining control of controlling the light distribution acquirer to obtain the light distribution in each shift of the phase of the bias planar wave by the predetermined amount; and an amplitude adjustment control of controlling the lighting device to search Fourier transform images obtained by Fourier transform of the light distributions in the respective shifts, for any reference image where only a peak derived from a moire fringe based on the three light-flux standing wave is observed, wherein the peak derived from the moire fringe based on the three light-flux standing wave has a period that is twice a period of a peak derived from a moire fringe based on the two light-flux standing wave, and to increase amplitude of the bias planar wave when there is no reference image, while decreasing the amplitude of the bias planar wave when the number of the reference images is not less than the threshold value. This enables the electric field distribution on the sample surface irradiated with the three light-flux standing wave to be just raised to have only a positive distribution or only a negative distribution.

In the microscopic observation device of the above aspect, the shift controller may be configured to control the lighting device to successively shift phase of the two light-flux standing wave in synchronism with phase of the bias planar wave, so as to successively shift the phase of the three light-flux standing wave. In this case, the shift controller is configured to control the lighting device to successively shift phase of one of the planar waves of the two light-flux standing wave by a predetermined phase, while successively shifting phase of the bias planar wave by half the predetermined phase, so as to successively shift the phase of the three light-flux standing wave. Furthermore, in this case, the shift controller is configured to control the lighting device to successively change optical path length of one of the planar waves of the two light-flux standing wave by a predetermined distance, while successively changing optical path length of the bias planar wave by half the predetermined distance, so as to successively shift the phase of the three light-flux standing wave. This enables the phase of the three light-flux standing wave to be shifted successively, while maintaining the synchronism of the phase of the three light-flux standing wave consisting of the two light-flux standing wave and the bias planar wave. This results in obtaining light information of, for example, reflected light and scattered light from the sample surface, while successively shifting the phase of the three light-flux standing wave.

The microscopic observation device of the above aspect may further comprise a rotary stage configured to place the sample thereon and rotate the sample about an axis of rotation which is the direction normal to the sample surface, wherein the shift controller is configured to control the rotary stage to rotate the sample surface by 90 degrees, to control the lighting device to successively shift the phase of the three light-flux standing wave before and after rotation of the sample surface by 90 degrees, and to control the light distribution acquirer to obtain the light distribution in each shift of the phase of the three light-flux standing wave. This readily irradiates the sample surface with the three light-flux standing wave in two directions orthogonal to the sample surface without adjusting the three light-flux standing wave, and obtains the light distribution while successively shifting the phase of the three light-flux standing wave.

BRIEF DESCRIPTION OF DRAWINGS

FIG. 15 is a diagram illustrating examples of respective data used in Equations (4) to (7) according to a modification;

DESCRIPTION OF EMBODIMENTS

The following describes various aspects of the invention with reference to some embodiments.

Embodiment 1

Figure 1:
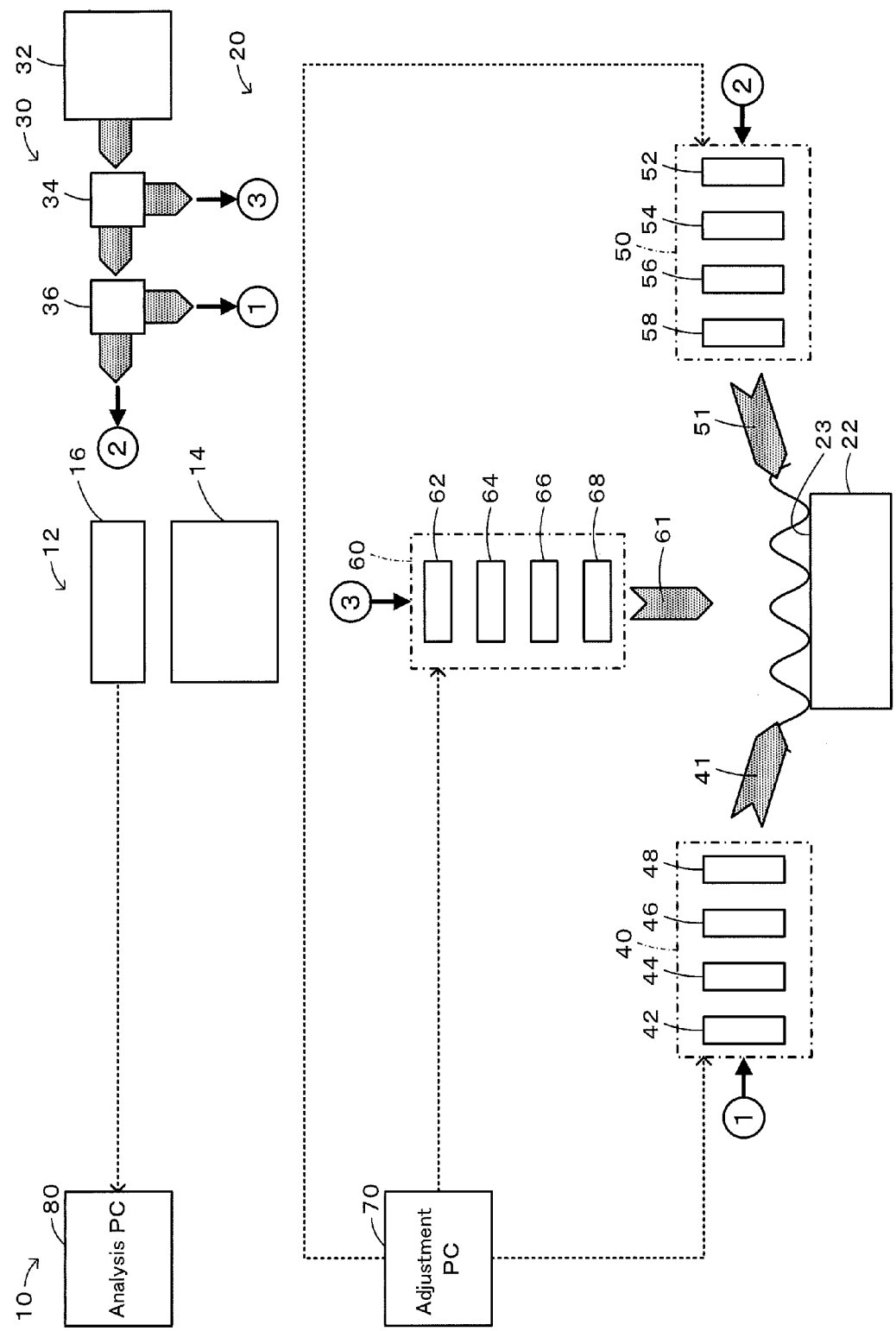
FIG. 1 is a configuration diagram illustrating the schematic configuration of a microscopic observation system 10 including a lighting device 20 according to one embodiment of the invention.
Figure 2:
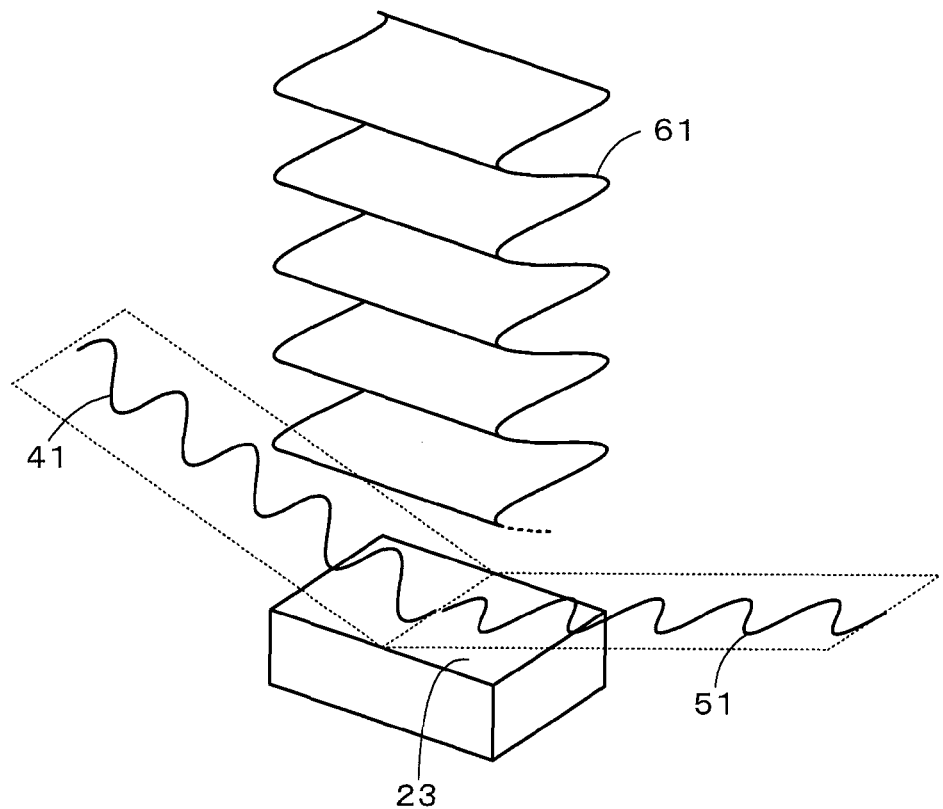
FIG. 2 is a diagram schematically illustrating illumination of a sample surface 23 irradiated with planar waves 41 and 51 for generating a standing wave by the lighting device 20 and illumination of the sample surface 23 irradiated with a bias planar wave 61 by the lighting device 20.

FIG. 1 is a configuration diagram illustrating the schematic configuration of a microscopic observation system 10 including a lighting device 20 according to one embodiment of the invention. FIG. 2 is a diagram schematically illustrating illumination of one surface 23 of a sample 22 (hereinafter referred to as sample surface) irradiated with two planar waves 41 and 51 for generating a standing wave by the lighting device 20 and illumination of the sample surface 23 irradiated with a bias planar wave 61 by the lighting device 20. The sample 22 may be, for example, a semiconductor wafer, a microscopic industrial product such as MEMS (micro electro mechanical systems) or Micro-TAS (micro total analysis systems), or biological cells as an object of non-staining observation.

As illustrated in FIG. 1, the microscopic observation system 10 of the embodiment includes: the lighting device 20 configured to irradiate the sample surface 23 with three lights (three light waves, three light fluxes); a lens mechanism 14 provided as an observation optical system comprised of a plurality of lenses including, for example, an objective lens and configured to transmit light from the sample surface 23; a light receiver 16 configured to receive light from the sample surface 23 via the lens mechanism 14 as measuring light using a plurality of light-receiving elements such as CCD (charge-coupled semiconductor devices) or CMOS (complementary metal oxide semiconductors); a general-purpose computer 70 (hereinafter referred to as adjustment PC) configured to drive various adjustment mechanisms of the lighting device 20; and a general-purpose computer 80 (hereinafter referred to as analysis PC) configured to input an amount of light received by the light receiver 16 in the form of a signal and analyze the input amount of received light to perform super-resolution. According to this embodiment, the lighting device 20, the lens mechanism 14 and the light receiver 16 constitute a microscopic observation device 12 (for example, optical microscope). This microscopic observation device 12, the adjustment PC 70 and the analysis PC 80 constitute the microscopic observation system 10.

The lighting device 20 of the embodiment includes: a light source assembly 30 configured to divide coherent light such as laser light into three light components and radiate the three light components; two standing wave-generating planar wave illumination units 40 and 50 located at opposed positions about the sample surface 23 and configured to irradiate the sample surface 23 with two planar waves 41 and 51 (two light waves, two light fluxes) (FIG. 2) which generate a standing wave when interfering with each other on the sample surface 23; and a bias planar wave illumination unit 60 located above the sample surface 23 in the vertical direction and configured to irradiate the sample surface 23 with a planar wave 61 (hereinafter referred to as bias planar wave) (FIG. 2) which raises an electric filed displacement of a standing wave (bias addition) when interfering with the standing wave on the sample surface 23. The illumination with the bias planar wave 61 irradiates the sample surface 23 from the location above the sample surface in the vertical direction and accordingly works as epi-illumination.

The light source assembly 30 includes a light source unit 32 provided as a coherent light source, a beam splitter 34 configured to divide light from the light source unit 32 into two light components and causes one of the light components to enter the bias planar wave illumination unit 60; and a beam splitter 36 configured to receive the other light component divided by the beam splitter 34, further divide the received other light component into two light components, and cause one of the light components to enter the standing wave-generating planar wave illumination unit 40, while causing the other of the light components to enter the standing wave-generating planar wave illumination unit 50.

The standing wave-generating planar wave illustration device 40 or 50 respectively includes: a polarization adjustment mechanisms 42 or 52 comprised of, for example, a polarizer and a wave plate and configured to adjust the incident light from the beam splitter 36 to s-polarized light having the plane of polarization (direction of electric field) parallel to the sample surface 23; an amplitude adjustment mechanism 44 or 54 comprised of, for example, a polarizer and a wave plate and configured to adjust the amplitude of the planar wave 41 or 51; a relative phase difference adjustment mechanism 46 or 56 comprised of a wave plate, a phase modulation element and a piezoactuator and configured to adjust the phase of the planar wave 41 or 51 for nanometer-order shift of the standing wave generated on the sample surface 23 by interference of the planar waves 41 and 51; and an incidence angle fine adjustment mechanism 48 or 58 comprised of, for example, a mirror and a piezoactuator and configured to finely adjust the angle of incidence of the planar wave 41 or 51 relative to the sample surface 23. According to this embodiment, the angles of incidence of the planar waves 41 and 51 relative to the sample surface 23 are adjusted in advance according to the relative positional relationships between the sample 22 and the standing wave-generating planar wave illumination units 40 and 50, such that a desired standing wave is generated on the sample surface 23 by interference of the planar waves 41 and 51. These angles of incidence can be finely adjusted by the incidence angle fine adjustment mechanisms 48 and 58.

The bias planar wave illumination unit 60 includes: a polarization adjustment mechanism 62 comprised of, for example, a polarizer and a wave plate and configured to adjust the incident light from the beam splitter 34 to have the plane of polarization (direction of electric field) aligned with the planes of polarization of the planar waves 41 and 51 for generating the standing wave; an amplitude adjustment mechanism 64 comprised of, for example, a polarizer and a wave plate and configured to adjust the amplitude of the bias planar wave 61; a phase different adjustment mechanism 66 comprised of a wave plate, a phase modulation element and a piezoactuator and configured to adjust the phase of the bias planar wave 61; and an incidence angle fine adjustment mechanism 68 comprised of, for example, a mirror and a piezoactuator and configured to finely adjust the angle of incidence of the bias planar wave 61 such as to enter perpendicular to the sample surface 23. According to this embodiment, the angle of incidence of the bias planar wave 61 relative to the sample surface 23 is adjusted in advance according to the relative positional relationship between the sample 22 and the bias planar wave illumination unit 60, such that illumination of the sample surface 23 with the bias planar wave 61 becomes epi-illumination as ideal as possible. This angle of incidence can be finely adjusted by the incidence angle fine adjustment mechanism 68.

The adjustment PC 70 includes a CPU, a ROM, a RAM, an HDD, input and output ports (not shown) and is connected with an input device such as a keyboard and a mouse, as well as with an output device such as a display. The adjustment PC 70 outputs drive signals via the output port for adjustment of the polarization adjustment mechanisms 42, 52 and 62, the amplitude adjustment mechanism 44, 54 and 64, the relative phase difference adjustment mechanisms 46 and 56, the phase different adjustment mechanism 66 and the incidence angle fine adjustment mechanism 48, 58 and 68 of the lighting device 20, so as to drive these various adjustment mechanisms of the lighting device 20.

The analysis PC 80 includes a CPU, a ROM, a RAM, an HDD, input and output ports (not shown) and is connected with an input device such as a keyboard and a mouse, as well as with an output device such as a display. The analysis PC 80 inputs the amount of measuring light received by the light receiver 16 in the form of a signal via the input port and applies a predetermined algorithm employed by a program stored in advance in the ROM to the input amount of received light to perform analysis and super-resolution. The predetermined algorithm implements super-resolution process (super-resolution technique) to perform super-resolution by shifting a plurality of times illumination with the standing wave generated on the sample surface 23 by the interference of the planar waves 41 and 51 (hereinafter referred to as standing-wave illumination). According to this embodiment, the following algorithm is used for the predetermined algorithm.

Figure 3:
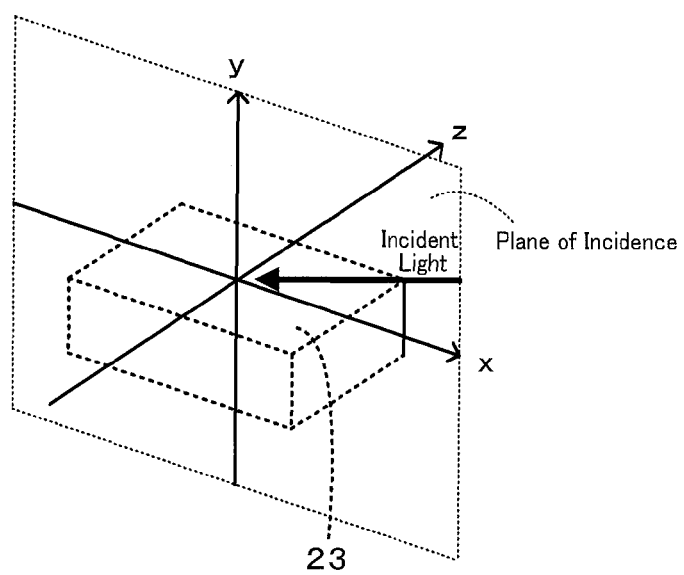
FIG. 3 is a diagram illustrating an exemplary relationship between the sample surface 23 and an x-axis direction, a y-axis direction and a z-axis direction.

The algorithm of the embodiment first specifies in advance the amount of received measuring light including scattered light from the sample surface 23 as an amount of light received $X_i$ at a position i (i=1 to n) on the light receiver 16, and obtains in advance a diffraction contribution ratio $D(|i-j|)$ representing a degree of diffraction according to an illuminating light intensity $I_j$ representing an intensity of illuminating light at a position j on the sample surface 23 and the relationship between the position j on the sample surface 23 and the position i on the light receiver 16. The algorithm adjusts the phase of at least one of the planar waves 41 and 51 for generating the standing wave, so as to input n amounts of received light $X_i$ by the light receiver 16 at each shift of m different shifts of the position of standing wave illumination on the sample surface 23 (at each position of standing wave illumination). The algorithm then determines a scattering efficiency $\alpha_j$ at the position j on the sample surface 23 by solving n×m simultaneous equations which are obtained from m different modes of standing wave illumination based on n equations expressed by the following Equations (8) with the scattering efficiency $\alpha_j$ as an unknown using the amounts of received light $X_i$, the illuminating light intensity $I_j$ and the diffraction contribution ratio $D(|i-j|)$ (i.e., by analyzing the amounts of received light $X_i$ using these simultaneous equations). This obtains an image based on light wave information from the sample surface 23 (i.e., forms an image). The algorithm of the embodiment achieves such image formation by shifting the standing wave illumination in a direction of intersection between the planes of incidence of the planar waves 41 and 51 for generating the standing wave and the sample surface 23 (hereinafter referred to as x-axis direction) and by shifting the standing wave illumination in a direction perpendicular to the x-axis direction on the sample surface 23 (hereinafter referred to as z-axis direction). This enables a clearer image to be obtained. This algorithm is not characteristic of the present invention, so that explanation of further details is omitted. FIG. 3 illustrates an example of the relationship between the sample surface 23 and the respective directions, x-axis direction, y-axis direction and z-axis direction. In the illustration, the y-axis direction is the direction normal to the sample surface 23. For the purpose of reference, FIG. 3 also illustrates the plane of incidence for specifying the x axis. In this embodiment, the following describes the state of the electric field on the sample surface 23 using the respective directions, x-axis direction, y-axis direction and z-axis direction, as appropriate.

$$X_i = \sum_j \alpha_j \times I_j \times D(|i-j|) \quad (8)$$

According to this embodiment, the term "super-resolution" means obtaining a clear image of an object in detail through an optical system such as lenses and may be translated as high-resolution or more specifically as resolution beyond the diffraction limit in an observation optical system. According to this embodiment, the expression of "shifting the illumination by standing wave (standing wave illumination)" denotes moving the positions of standing wave nodes defining the illumination by standing wave (standing wave illumination) in a predefined direction.

Figure 4:
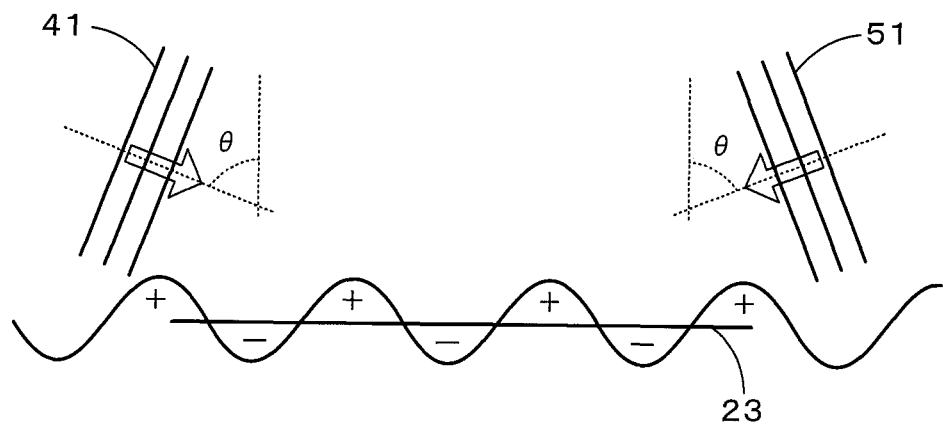
FIG. 4 is a diagram schematically illustrating the state of a prior art that illuminates the sample surface 23 with only the planar waves 41 and 51 for generating the standing wave.
Figure 5:
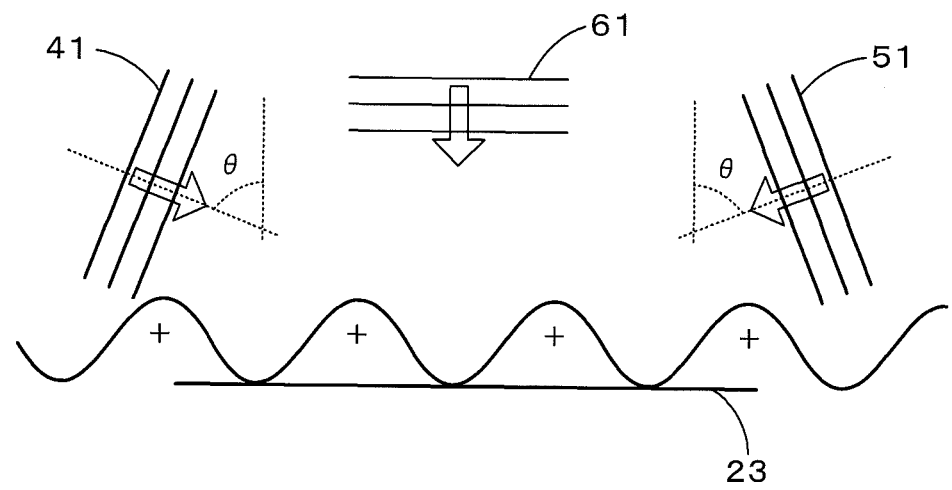
FIG. 5 is a diagram schematically illustrating the state of this embodiment that illuminates the sample surface 23 with the planar waves 41 and 51 for generating the standing wave, as well as with the bias planar wave 61.
Figure 6:
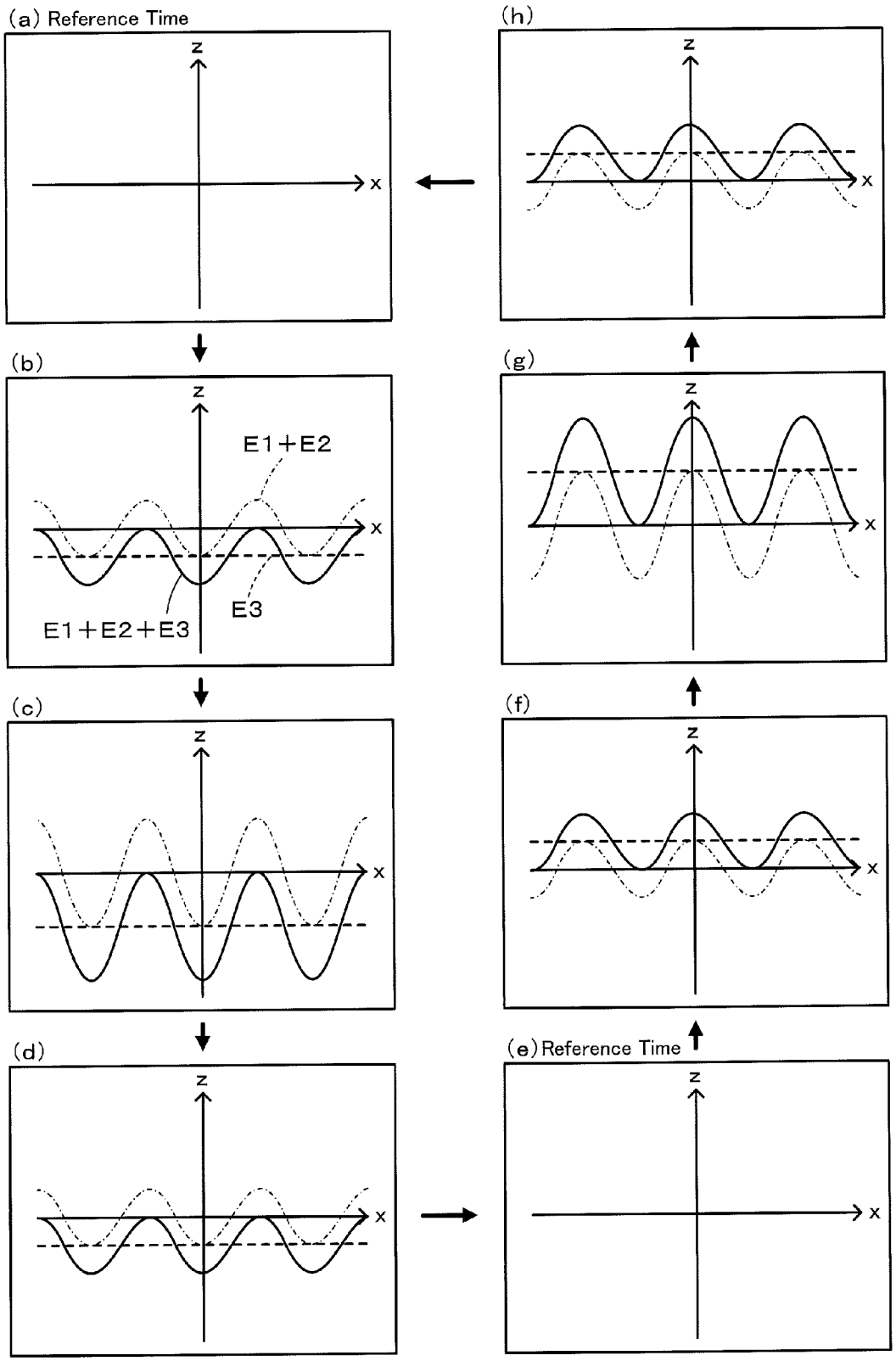
FIG. 6 is diagrams illustrating an exemplary time change of the electric field on the sample surface 23 in the case of interference between the standing wave illumination by the planar waves 41 and 51 and the illumination by the bias planar wave 61 on the sample surface 23.

The following describes the operations of the lighting device 20 included in the microscopic observation system 10 of the embodiment having the above configuration. FIG. 4 is a diagram schematically illustrating the state of a prior art that illuminates the sample surface 23 with only the planar waves 41 and 51 for generating the standing wave. FIG. 5 is a diagram schematically illustrating the state of this embodiment that illuminates the sample surface 23 with the planar waves 41 and 51 for generating the standing wave, as well as with the bias planar wave 61. FIG. 6 is diagrams illustrating an exemplary time change of the electric field on the sample surface 23 in the case of interference between the standing wave illumination by the planar waves 41 and 51 and the illumination by the bias planar wave 61 on the sample surface 23. In FIGS. 4 and 5, "0" represents an angle of incidence of the planar wave 41 or 51 to the sample surface 23 (scalar quantity according to this embodiment), and the waveform on the sample surface 23 denotes one state of the waveform of the sum of the electric fields of the respective illuminations on the sample surface 23. The waveform of the electric field originally denotes the waveform of a time change in electric field displacement in the z-axis direction on the sample surface 23 but is shown as the waveform oscillating in the top-to-bottom direction on the sheet surface which is the y-axis direction for the convenience of illustration. In FIG. 6, the dashed line indicates an electric field distribution (distribution of electric field displacement) of only the standing wave by interference of the planar waves 41 and 51; the broken line indicates an electric field distribution of only the bias planar wave 61; and the solid line indicates an electric field distribution of the sum of the respective illuminations on the sample surface 23 by the interference between the planar waves 41 and 51 and the bias planar wave 61. The electric field distribution repeats the state of FIG. 6 (*a*) to 6 (*h*) in this order with time. Among these states, the states of FIGS. 6 (*a*) and 6 (*e*) show the state of electric field distribution in a "reference time" specified in advance by experiment or analysis as the time when the electric field displacement of the standing wave has a value "0" at respective positions on the sample surface 23 (respective positions on the xz plane).

The description first regards the operations of the standing wave-generating planar wave illumination units 40 and 50 of the lighting device 20. According to this embodiment, E1 and E2 respectively represent electric fields of the two light-wave planar waves 41 and 51 for generating the standing wave; A represents an amplitude of the respective planar waves 41 and 51; k represents a wave number of the respective planar waves 41 and 51; θ represents an angle of incidence of the planar waves 41 and 51 to the sample surface 23 (described above); x represents a position in the direction of intersection between the planes of incidence of the planar waves 41 and 51 and the sample surface 23 (described above); y represents a position in the direction normal to the sample surface 23 (described above); ω represents an angular frequency; and t represents a time. Among these, the amplitude A and the angle of incidence θ are target values as the object of adjustment, and the electric fields E1 and E2 are target values to be finally obtained (waveforms of the planar waves 41 and 51). The wave number k and the angular frequency ω are values determined in advance based on the characteristics of the light source assembly 30. The standing wave-generating planar wave illumination units 40 and 50 illuminate the sample surface 23 with the two light-wave planar waves 41 and 51 satisfying the relationships expressed by Equation (1) and Equation (2) given below. More specifically, the adjustment PC 70 drives the polarization adjustment mechanisms 42 and 52 to adjust the incident light from the beam splitter 36 to s-polarized light having the plane of polarization parallel to the sample surface 23, drives the amplitude adjustment mechanisms 44 and 54 to adjust the respective amplitudes of the planar waves 41 and 51 to the amplitude A as the target value, drives the relative phase difference adjustment mechanisms 42 and 52 to adjust the respective phases of the planar waves 41 and 51 for nanometer-order shift of the standing wave generated on the sample surface 23 by interference of the planar waves 41 and 51 according to the predetermined algorithm described above, and drives the incidence angle fine adjustment mechanisms 48 and 58 to finely adjust the respective angles of incidence of the planar waves 41 and 51 to the sample surface 23 to the angle of incidence θ as the target value.

$$E1 = A \cdot \sin(-\omega \cdot t + k \cdot \sin\theta \cdot x - k \cdot \cos\theta \cdot y) \quad (1)$$

$$E2 = A \cdot \sin(-\omega \cdot t - k \cdot \sin\theta \cdot x - k \cdot \cos\theta \cdot y) \quad (2)$$

When the standing wave-generating planar wave illumination units 40 and 50 are driven to achieve the standing wave illumination satisfying the relationships expressed by Equation (1) and Equation (2) (on the assumption of only this standing wave illumination), the electric field distribution ranging from the positive to the negative on the sample surface 23 appears periodically in the standing wave as shown by the waveform of FIG. 4 and the dashed line waveform of FIG. 6. In other words, the electric field distribution on the sample surface 23 has adjacent peaks ranging from the positive to the negative (changing from the positive to the negative and vice versa).

The description subsequently regards the operations of the bias planar wave illumination unit 60 of the lighting device 20. According to this embodiment, E3 represents an electric field of the bias planar wave 61; the amplitude of the bias planar wave 61 (bias amplitude) is equal to the amplitude of the standing wave generated by interference of the planar waves 41 and 51 (i.e., twice the amplitude A); k represents a wave number of the bias planar wave 61; y represents a position in the direction normal to the sample surface 23 (described above); co represents an angular frequency; and t represents a time. Among these, the bias amplitude is a target value as the object of adjustment, and the electric field E3 is a target value to be finally obtained (waveform of the bias planar wave 61). As described above, the wave number k and the angular frequency ω are values determined in advance based on the characteristics of the light source assembly 30. The bias planar wave illumination unit 60 illuminates the sample surface 23 with the bias planar wave 61 satisfying the relationship expressed by Equation (3) given below. More specifically, the adjustment PC 70 drives the polarization adjustment mechanism 62 to adjust the incident light from the beam splitter 34 to have the plane of polarization aligned with the planes of polarization of the planar waves 41 and 51 for generating the standing wave, drives the amplitude adjustment mechanism 64 to adjust the bias amplitude of the bias planar wave 61 to the target value (twice the amplitude A), drives the phase difference adjustment mechanism 62 to obtain the phase of the electric field E3 of Equation (3) (initial phase according to the position in the y-axis direction but irrespective of the position in the x-axis direction), and drives the incidence angle fine adjustment mechanism 68 to finely adjust the bias planar wave 61 to enter perpendicularly to the sample surface 23.

$$E3 = 2 \cdot A \cdot \sin(-w \cdot t - k \cdot y) \tag{3}$$

When the bias planar wave illumination unit 60 is driven to achieve the illumination with the bias planar wave 61 satisfying the relationship expressed by Equation (3) (on the assumption of only the illumination with this bias planar wave 61), as shown by the broken line waveform of FIG. 6, the bias planar wave 61 is synchronized with the standing wave (shown by the dashed line in FIG. 6) to alternately oscillate to the positive and to the negative with an equal displacement irrespective of the position on the sample surface 23 (position on the xz plane) across a "reference time" specified in advance as the time when the electric field displacement of the standing wave has a value "0" at the respective positions on the sample surface 23 (respective positions on the xz plane) and oscillates at the bias amplitude (the value of 2A) equal to the amplitude of the standing wave. The bias amplitude herein is equal to the amplitude of the standing wave, i.e., equal to twice the amplitude A (the value of 2A) of the planar waves 41 and 51 for generating the standing wave. As clearly understood from FIG. 6, the bias amplitude is the amplitude to raise the electric field displacement of the standing wave on the sample surface 23 (electric field displacement of another light wave group (planar waves 41 and 51) present on the sample surface 23) just to only the positive displacement or to only the negative displacement.

As described above, the sample surface 23 is subjected to illumination with the bias planar wave 61 which is synchronized with the standing wave and oscillates at the amplitude equal to the amplitude of the standing wave, in addition to the standing wave illumination. This causes the electric field distribution just raised to have only the positive distribution or only the negative distribution (i.e., the electric field distribution just raised not to range from the positive to the negative) from the electric field distribution ranging from the positive to the negative on the sample surface 23 by the standing wave illumination to periodically appear as shown by the solid line in FIG. 6 as the sum of the electric fields E1, E2 and E3 generated on the sample surface 23. In other words, the electric field distribution on the sample surface 23 has the waveform with adjacent peaks that are not changed from the positive to the negative or vice versa.

Figure 7:
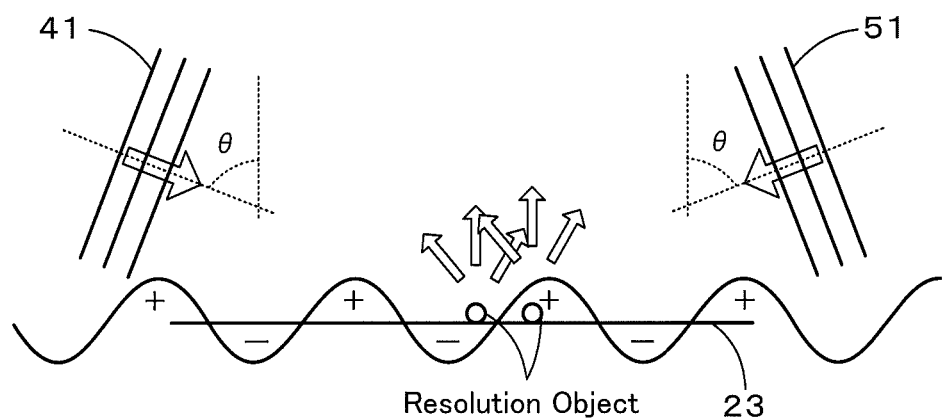
FIG. 7 is a diagram illustrating an exemplary state of resolution of two resolution objects on the sample surface 23 in the prior art of FIG. 4.
Figure 8:
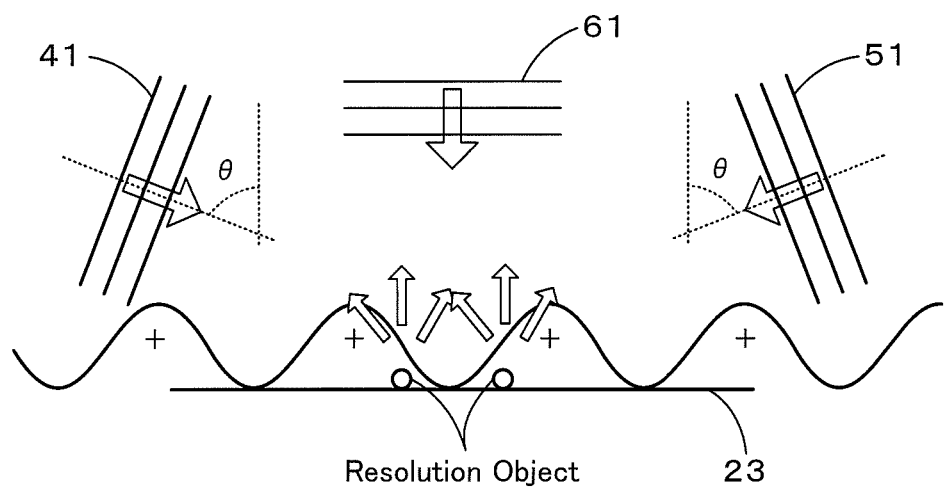
FIG. 8 is a diagram illustrating an exemplary state of resolution of two resolution objects on the sample surface 23 in the embodiment of FIG. 5.
Figure 9:
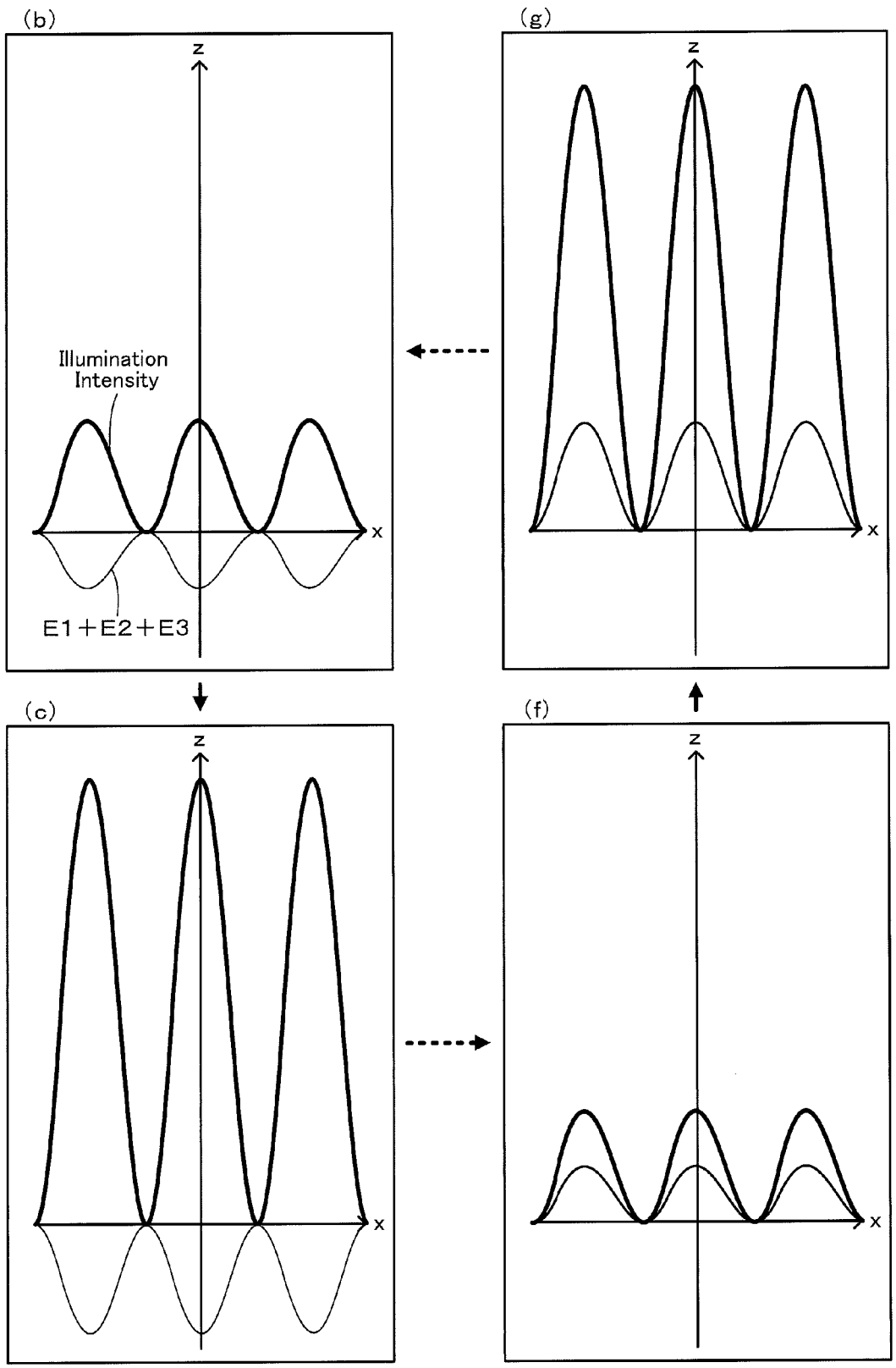
FIG. 9 is diagrams illustrating an exemplary state of a time change in illumination intensity on the sample surface 23 by interference between the standing wave illumination with the planar waves 41 and 51 and the illumination with the bias planar wave 61 on the sample surface 23.

FIG. 7 is a diagram illustrating an exemplary state of resolution of two resolution objects on the sample surface 23 in the prior art of FIG. 4. FIG. 8 is a diagram illustrating an exemplary state of resolution of two resolution objects on the sample surface 23 in the embodiment of FIG. 5. FIG. 9 is diagrams illustrating an exemplary state of a time change in illumination intensity (square value of the electric field) on the sample surface 23 by interference between the standing wave illumination with the planar waves 41 and 51 and the illumination with the bias planar wave 61 on the sample surface 23. In FIG. 9, the thin solid lines indicate the electric field distribution of the sum of the respective illuminations on the sample surface 23 by the interference between the planar waves 41 and 51 and the bias planar wave 61. The thick solid lines indicate the illumination intensity on the sample surface 23 after the interference between the planar wave 41 and 51 and the bias planar wave 61. FIG. 9 shows the four states respectively corresponding to FIGS. 6(*b*), 6(*c*), 6(*f*) and 6(*g*).

The sample response to illumination having the minute periodic distribution of illumination intensity is used for super-resolution process (super-resolution technique) that utilizes the structural illumination such as the lighting device 20 of the embodiment. As shown in FIG. 7, in the case of only the standing wave illumination of the prior art, the electric field distribution on the sample surface 23 (distribution of electric field displacement) has the adjacent peaks changing from the positive to the negative and vice versa, so that pieces of light wave information on adjacent peaks from the sample surface 23 cancel out each other. In this case, the object to which the super-resolution process is applied is limited to only special samples, for example, luminescent samples, which are capable of forming an incoherent image even using a coherent light source. The super-resolution process is thus not widely applicable to general samples. As shown in FIG. 8 as the state of the embodiment, the illumination with the bias planar wave 61 in addition to the standing wave illumination, on the other hand, generates the electric field distribution on the sample surface 23 with the adjacent peaks not changing from the positive to the negative or vice versa, so as to provide the minute periodic distribution of illumination intensity (FIG. 9). This results in not cancelling out the pieces of light wave information on the adjacent peaks from the sample surface 23 but forming an image by addition of the pieces of light wave information. The object of the super-resolution process of irradiating the sample with light from a coherent light source, receiving the measuring light from the sample to form an image and performing super-resolution is not limited to special samples that emit the measuring light with incoherence, such as fluorescent samples. The super-resolution process is thus applicable to general samples, irrespective of the coherence or incoherence of the measuring light including the scattered light from the sample.

The lighting device 20 of the embodiment uses the bias planar wave 61 which is synchronized with the standing wave and oscillates at the amplitude equal to the amplitude of the standing wave, so as to raise the electric field distribution ranging from the positive to the negative on the sample surface 23 by standing wave illumination to just the electric field having only the positive distribution or only the negative distribution (i.e., raise to just the electric field distribution not ranging from the positive to the negative). Compared with the configuration using a smaller raising amount than the amount of raising the electric field distribution ranging from the positive to the negative on the sample surface 23 by standing wave illumination to just the electric field having only the positive distribution or only the negative distribution, this more effectively suppresses the pieces of light wave information on the adjacent peaks from the sample surface 23 from cancelling out each other. Compared with the configuration using a larger raising amount than the amount of raising the electric field distribution ranging from the positive to the negative on the sample surface 23 by standing wave illumination to just the electric field having only the positive distribution or only the negative distribution, this forms an image of the clearer shading.

Figure 10:
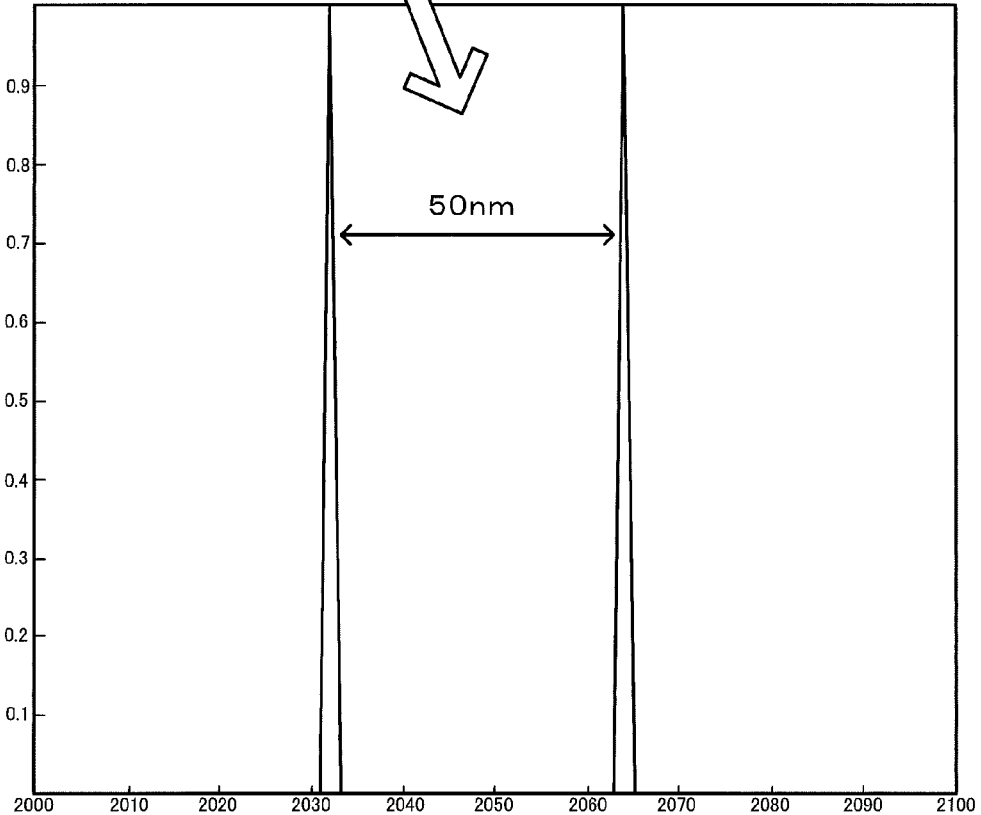
FIG. 10 is a diagram illustrating computer simulation conditions in application of a super-resolution process.
Figure 11:
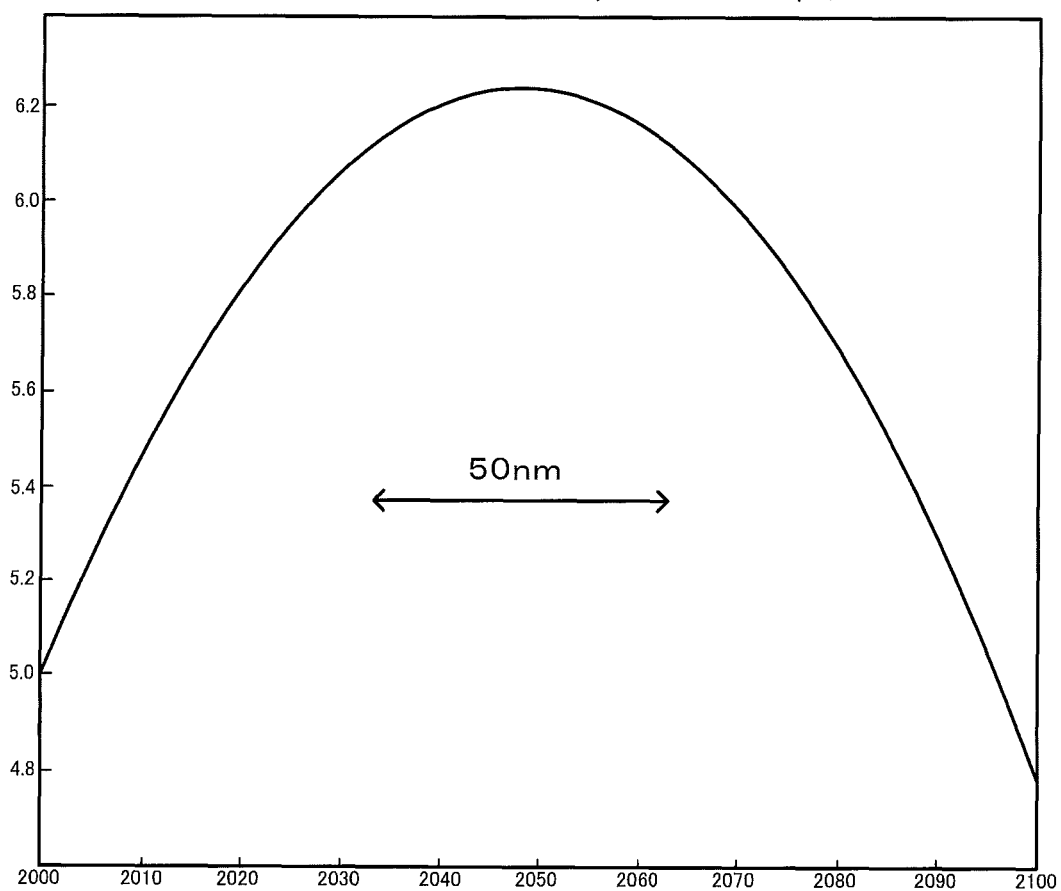
FIG. 11 is a diagram illustrating an exemplary distribution of illumination intensity obtained by a general optical microscope.
Figure 12:
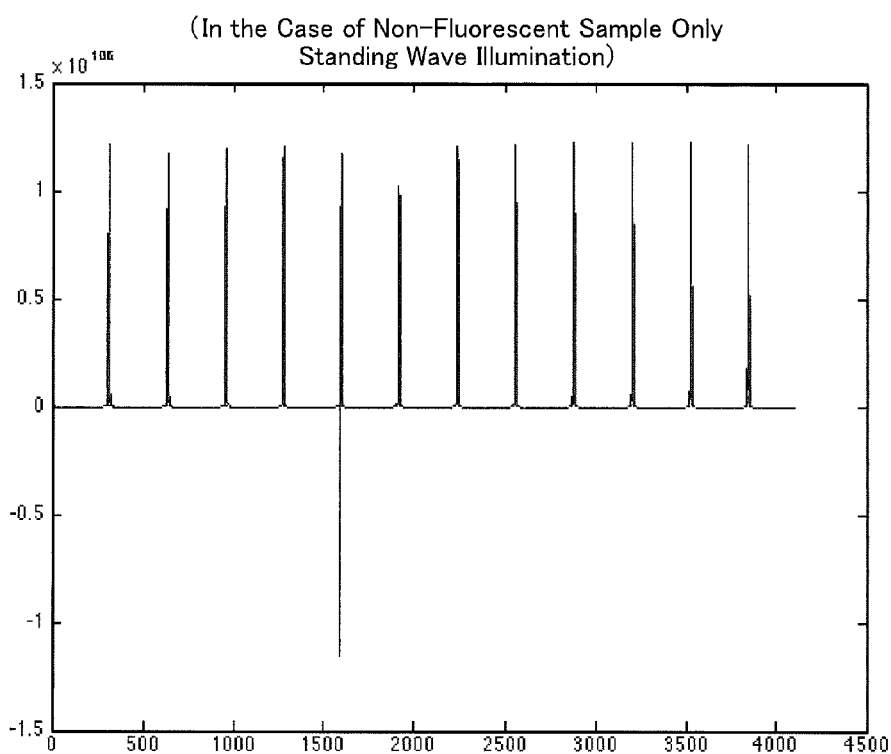
FIG. 12 is a diagram illustrating an exemplary distribution of illumination intensity as the result of computer simulation of the super-resolution process with regard to a general sample subject to only standing wave illumination.
Figure 13:
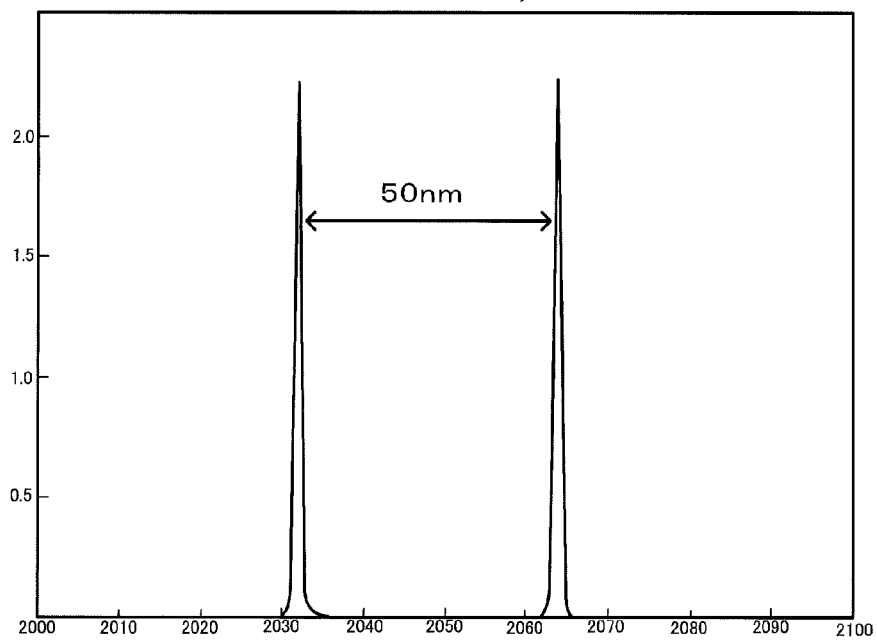
FIG. 13 is a diagram illustrating an exemplary distribution of illumination intensity as the result of computer simulation of the super-resolution process with regard to a fluorescent sample subject to only the standing wave illumination.
Figure 14:
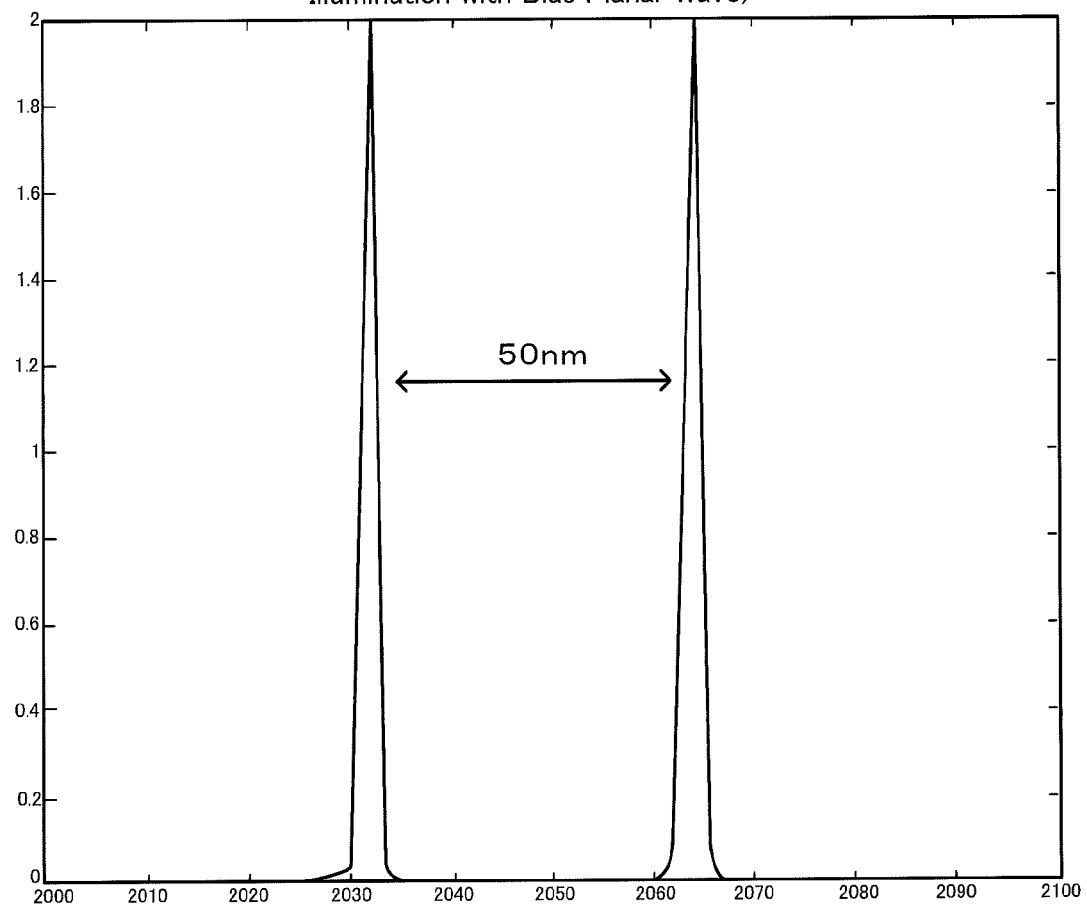
FIG. 14 is a diagram illustrating an exemplary distribution of illumination intensity as the result of computer simulation of the super-resolution process using the lighting device 20 with regard to a general sample.

FIG. 10 illustrates computer simulation conditions in the application of the super-resolution process. FIG. 11 illustrates an exemplary distribution of illumination intensity obtained by a general optical microscope. FIG. 12 illustrates an exemplary distribution of illumination intensity as the result of computer simulation of the super-resolution process under the conditions shown in FIG. 10 with regard to a general sample subject to only the standing wave illumination. FIG. 13 illustrates an exemplary distribution of illumination intensity as the result of computer simulation of the super-resolution process under the conditions shown in FIG. 10 with regard to a fluorescent sample subject to only the standing wave illumination. FIG. 14 illustrates an exemplary distribution of illumination intensity as the result of computer simulation of the super-resolution process under the conditions shown in FIG. 10 with regard to a general sample subject to both the standing wave illumination and the illumination with the bias planar wave (super-resolution process using the lighting device 20 of the embodiment). The simulation conditions shown in FIG. 10 are: the wavelength of light from the light source is 488 nm; the pitch of the standing wave (length between adjacent nodes) is 270 nm; the frequency of shifts of the standing wave illumination to a specified direction in the super-resolution process is 10 times; the shift step size (shift amount) of each shift is 25 nm; the numerical aperture (NA) of the optical system (lens numerical aperture of the lens mechanism 14 of the embodiment) is 0.95; the Rayleigh limit is 313 nm; and the positions of two resolution object samples are distant from each other by 50 nm (positions on the sample surface 23). As shown in FIG. 11, in the case of the general optical microscope, the image of the resolution object sample is blur and is not observable at all. As shown in FIG. 12, the prior art that irradiates the non-fluorescent but general sample by only the standing wave illumination does not allow for super-resolution, due to the divergence. As shown in FIG. 13, the prior art that irradiates the fluorescent sample by only the standing wave illumination, on the other hand, conventionally allows for super-resolution. As shown in FIG. 14, the lighting device 20 of the embodiment using both the standing wave illumination and the illumination with the bias planar wave distinctly separates the fine structure equivalent to 50 nm distance with respect to the non-fluorescent but general sample to form an image and allow for super-resolution.

In the lighting device 20 included in the microscopic observation system 10 of the embodiment described above, the standing wave-generating planar wave illumination units 40 and 50 use the light from the light source assembly 30 to generate the two light-wave planar waves 41 and 51, and illuminate the sample surface 23 with the standing wave generated by interference between the generated two light-wave planar waves 41 and 51 on the sample surface 23. Additionally, the bias planar wave illumination unit 60 uses the light from the light source assembly 30 to generate the bias planar wave 61 as the planar wave which is synchronized with the standing wave to alternately oscillate to the positive and to the negative with an equal electric field displacement irrespective of the position on the sample surface 23 across the reference time specified in advance as the time when the electric field displacement of the standing wave has a value "0" at the respective positions on the sample surface 23 and oscillates at the bias amplitude (the amplitude of the value 2A equal to the amplitude of the standing wave) specified in advance as the amplitude to raise the electric field displacement of the standing wave on the sample surface 23 just to only the positive displacement or to only the negative displacement, and illuminates the sample surface 23 with the generated bias planar wave 61. Accordingly, in the case of only the illumination with the standing wave, the electric field distribution ranging from the positive to the negative on the sample surface appears periodically in the standing wave. Addition of the illumination with the bias planar wave 61, however, causes the electric field distribution just raised to have only the positive distribution or only the negative distribution (i.e., the electric field distribution just raised not to range from the positive to the negative) from the electric field distribution ranging from the positive to the negative on the sample surface 23 to appear periodically. This suppresses the pieces of light wave information from the sample surface 23 from cancelling out each other and causes the super-resolution process not to be limited to fluorescent samples but to be applied to general samples. This accordingly expands the range of application of the super-resolution process using the light wave information from the sample surface 23.

The lighting device 20 included in the microscopic observation system 10 of the embodiment uses the bias planar wave 61 which is synchronized with the standing wave and oscillates at the amplitude equal to the amplitude of the standing wave, so as to raise the electric field distribution ranging from the positive to the negative on the sample surface 23 by standing wave illumination to just the electric field having only the positive distribution or only the negative distribution (i.e., raise to just the electric field distribution not ranging from the positive to the negative). The bias planar wave 61 may be configured to have a slightly smaller raising amount than the amount of raising the electric field distribution ranging from the positive to the negative on the sample surface 23 by standing wave illumination to just the electric field having only the positive distribution or only the negative distribution, or may alternatively be configured to have a slightly larger raising amount than the amount of raising (twice the value A) the electric field distribution ranging from the positive to the negative on the sample surface 23 by standing wave illumination to just the electric field having only the positive distribution or only the negative distribution. The slightly smaller raising amount may be obtained by setting the bias amplitude of the bias planar wave 61 to, for example, 1.9 times larger than the value A. The slightly larger raising amount may be obtained by setting the bias amplitude of the bias planar wave 61 to, for example, 2.1 times larger than the value A.

The lighting device 20 included in the microscopic observation system 10 of the embodiment uses the bias planar wave 61 which is synchronized with the standing wave generated by interference of the planar waves 41 and 51 to alternately oscillate to the positive and to the negative with an equal electric field displacement irrespective of the position on the sample surface 23 across the "reference time" specified in advance as the time when the electric field displacement of the standing wave has a value "0" at the respective positions on the sample surface 23. This "reference time" may alternatively be a time immediately before or a time immediately after the time when the electric field displacement of the standing wave has the value "0" at the respective positions on the sample surface 23.

The lighting device 20 included in the microscopic observation system 10 of the embodiment is the epi-illumination type that makes the illumination with the bias planar wave 61 as the epi-illumination but may alternatively be the transmission type. The standing wave illumination may be evanescent type illumination. The microscopic observation device 12 including the lighting device 20 may be a dark-field device using a polarizer or may be a bright-field device.

The lighting device 20 included in the microscopic observation system 10 of the embodiment uses the predetermined algorithm described above for the super-resolution process. The super-resolution process may, however, be different from this embodiment: for example, a process (technique) of combining a plurality of images obtained in the frequency space domain, computing the inverse Fourier transform after bandwidth expansion and obtaining a super-resolution observed image in the real space domain or a process (technique) of successively performing iterative operations from a plurality of obtained images and obtaining a super-resolution observed image.

The lighting device 20 included in the microscopic observation system 10 of the embodiment does not specifically take into account the reflected light waves by reflection of the respective light waves from the sample surface 23 but may alternatively take into account the reflected light waves when the reflected light waves are expected to have relatively significant influences. In such a modification, the bias planar wave illumination unit 60 of the lighting device 20 has the operations described below. The standing wave-generating planar wave illumination units 40 and 50 of the lighting device have the same operations as those described in the embodiment.

According to this modification, E1r and E2r represent electric fields of the respective reflected light waves by reflection of the planar waves 41 and 51 for generating the standing wave from the sample surface 23; r1 and r2 represent reflectivities of the planar waves 41 and 51 from the sample surface 23; and δ1 and δ2 represent phase differences between the planar waves 41 and 51 and the reflected light waves by reflection of the planar waves 41 and 51 from the sample surface 23. The amplitude A, the wave number k, the angle of incidence θ, the position x, the position y, the angular frequency ω and the time t are the same as those of the embodiment. The relationships of Equation (4) and Equation (5) given below are satisfied with regard to the respective reflected light waves of the planar waves 41 and 51. Additionally, E3r represents an electric field of the reflected light wave by reflection of the bias planar wave 61 from the sample surface 23; r3 represents a reflectivity of the bias planar wave 61 from the sample surface 23; δ3 represents a phase difference between the bias planar wave 61 and the reflected light wave by reflection of the bias planar wave 61 from the sample surface 23; P represents a corrected amplitude by correction of the bias amplitude (the value of 2A) assumed to be equal to the amplitude of the standing wave; ΔD represents a phase correction amount by correction of the phase of the bias planar wave 61; and E3a represents a corrected electric field by correction of the electric field E3 using the corrected amplitude P and the phase correction amount ΔD. The relationship of Equation (6) given below is satisfied with regard to the reflected light wave of the bias planar wave 61. The bias planar wave 61 also has the relationship of Equation (7). The corrected amplitude P and the phase correction amount ΔD are target values as the objects of adjustment. The corrected electric field E3a is a target value to be finally obtained (waveform of the bias planar wave 61). As described above, the wave number k and the angular frequency ω are values determined in advance based on the characteristics of the light source assembly 30. An electric field as the sum of the electric fields E1, E1r, E2, E2r, E3a and E3r is generated on the sample surface 23.

$$E1r = r1 \cdot A \cdot \sin(-\omega \cdot t + k \cdot \sin\theta \cdot x + k \cdot \cos\theta \cdot y + \delta 1) \quad (4)$$

$$E2r = r2 \cdot A \cdot \sin(-\omega \cdot t + k \cdot \sin\theta \cdot x + k \cdot \cos\theta \cdot y + \beta 2) \quad (5)$$

$$E3r = P \cdot r3 \cdot \sin(-\omega \cdot t + k \cdot y + \Delta D + \delta 3) \quad (6)$$

$$E3a = P \cdot \sin(-\omega \cdot t + k \cdot y + \Delta D) \quad (7)$$

In this modification, the corrected amplitude P is specified in advance by experiment or analysis as the amplitude to raise the electric field displacement of the sum of the standing wave and all the reflected light waves (i.e., the reflected light wave of the planar waves 41 and 51 and the reflected light wave of the bias planar wave 61) on the sample surface 23 (i.e., the electric field displacement of the sum of the electric fields E1, E1r, E2, E2r and E3r) just to only the positive displacement or only the negative displacement (i.e., raise just not to range from the positive to the negative). The phase correction amount ΔD is specified in advance by experiment or analysis, such that the electric field displacement by only the bias planar wave 61 (i.e., the electric field displacement of the electric field E3a) has a value "0" irrespective of the position on the sample surface 23 at the timing of "reference time" specified in advance as the time when the electric field displacement of the sum of the electric field of the standing wave and the electric fields of all the reflected light waves from the sample surface 23 (i.e., the electric field displacement of the sum of the electric fields E1, E1r, E2, E2r and E3r) becomes equal to a value "0" or approximately equal to the value "0" at the respective positions on the sample surface 23. Accordingly, correction of the amplitude by the corrected amplitude P denotes correction of the bias amplitude based on the electric field displacements of all the reflective light waves on the sample surface 23. Correction of the phase by the phase correction amount ΔD denotes correction of the "reference time" based on the electric field displacements of all the reflected light waves on the sample surface 23.

In this modification, the bias planar wave illumination unit 60 illuminates the sample surface 23 with the bias planar wave 61 satisfying the relationship expressed by Equation (7). More specifically, the adjustment PC 70 drives the polarization adjustment mechanism 62 to adjust the incident light from the beam splitter 34 to have the plane of polarization aligned with the planes of polarization of the planar waves 41 and 51 for generating the standing wave, drives the amplitude adjustment mechanism 64 to adjust the amplitude of the bias planar wave 61 to the corrected amplitude P, drives the phase difference adjustment mechanism 62 to obtain the phase of the electric field E3a of Equation (7) including the phase correction amount ΔD (initial phase according to the position in the y-axis direction but irrespective of the position in the x-axis direction), and drives the incidence angle fine adjustment mechanism 68 to finely adjust the bias planar wave 61 to enter perpendicularly to the sample surface 23. In other words, the bias planar wave illumination unit 60 specifies in advance the corrected amplitude P to raise the electric field displacement of the sum of the standing wave and all the reflected light waves on the sample surface 23 (i.e., the electric field displacement of another light wave group present on the sample surface 23) just not to range from the positive to the negative and the phase correction amount ΔD to cause the electric field displacement by only the bias planar wave 61 to have the value "0" irrespective of the position on the sample surface 23 at the timing of the above "reference time", based on the relationships of Equations (4) to (6) (by taking into account the respective reflected light waves). The bias planar wave illumination unit 60 then makes the illumination with the bias planar wave 61 having the corrected electric field E3a satisfying the relationship of Equation (7) by correction of the electric field E3 using the corrected amplitude P and the phase correction amount ΔD specified as described above.

Like the embodiment, this modification enables the electric field distribution just raised to have only the positive distribution or only the negative distribution (i.e., the electric field distribution just raised not to range from the positive to the negative) from the electric field distribution ranging from the positive to the negative on the sample surface 23 to appear periodically by addition of the illumination with the bias planar wave 61. This suppresses the pieces of light wave information from the sample surface 23 from cancelling out each other and causes the super-resolution process not to be limited to fluorescent samples but to be applied to general samples. This accordingly expands the range of application of the super-resolution process using the light wave information from the sample surface 23.

Some examples of the respective data used in this modification are given. As shown in Example 1 of FIG. 15, in the case of setting the amplitude A to the value 1.0, the reflectivities r1 and r2 to the value 0.4, the reflectivity r3 to the value 0.2 and the phase differences δ1, δ2 and δ3 to the value 3.14, the result of analysis shows that the corrected amplitude P should be set to the value 1.5 and the phase correction amount AD should be set to the value 0. As shown in Example 2 of FIG. 15, in the case of setting the amplitude A to the value 1.0, the reflectivities r1 and r2 to the value 0.75, the reflectivity r3 to the value 0.55 and the phase differences δ1, δ2 and δ3 to the value 3.14, the result of analysis shows that the corrected amplitude P should be set to the value 1.1 and the phase correction amount ΔD should be set to the value 0. As shown in Example 3 of FIG. 15, in the case of setting the amplitude A to the value 1.0, the reflectivities r1 and r2 to the value 0.3, the reflectivity r3 to the value 0.2, the phase differences δ1 and δ2 to the value 1.57 and the phase difference δ3 to the value 3.14, the result of analysis shows that the corrected amplitude P should be set to the value 2.6 and the phase correction amount ΔD should be set to the value 0.28.

Embodiment 2

Figure 16:
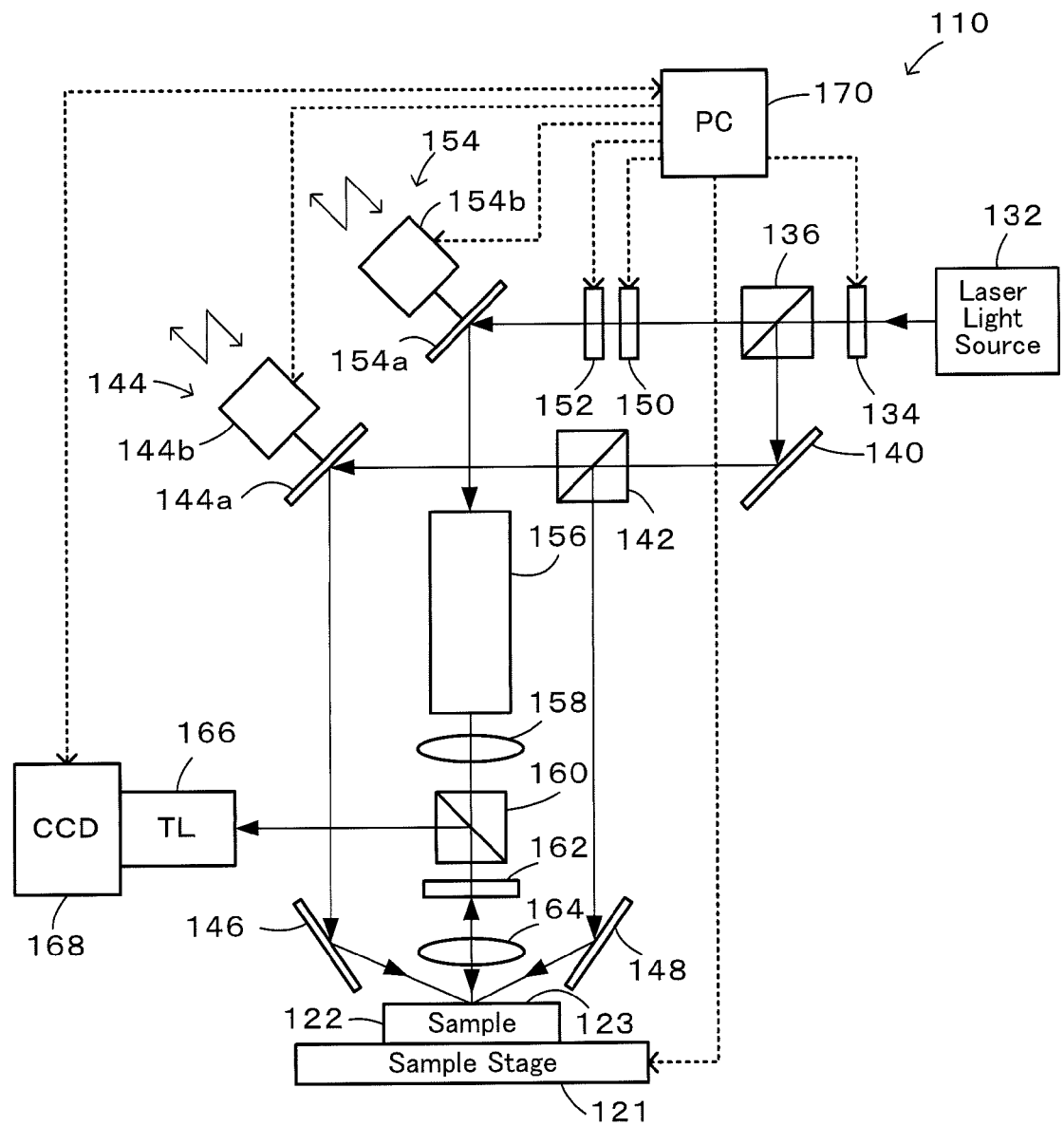
FIG. 16 is a configuration diagram illustrating the schematic configuration of a microscopic observation system 110 according to a second embodiment.

The following describes a microscopic observation system 110 of a second embodiment configured to incorporate specific devices therein using the two light-wave planar waves and the bias planar wave having the principles described in the above embodiment. FIG. 16 is a configuration diagram illustrating the schematic configuration of the microscopic observation system 110 according to the second embodiment. As illustrated, the microscopic observation system 110 of the second embodiment includes: a sample stage 121 provided as a rotary stage on which a sample 122 is placed; a laser light source 132: a wave plate 134 configured to arbitrarily change the polarization direction of linearly polarized light from the laser light source 132: a polarizing beam splitter 136 configured to divide the light having the polarization direction determined by the wave plate 134 into a transmitted component of polarization parallel to the sheet surface of FIG. 16 (hereinafter referred to as "in-plane polarization") and a reflected component of polarization perpendicular to the sheet surface of FIG. 16 (hereinafter referred to as "perpendicular polarization"); a mirror 140 configured to change the direction of perpendicular polarization component reflected by the polarizing beam splitter 136; a beam splitter 142 configured to divide the perpendicular polarization component from the mirror 140 into two light fluxes; a mirror 148 configured to irradiate a sample surface 123 of the sample 122 with one division of the perpendicular polarization component from the beam splitter 142; a drive mirror 144 comprised of a mirror 144a arranged to change the direction of the other division of the perpendicular polarization component from the beam splitter 142 and a piezoactuator 144b configured to drive the mirror 144a to change the optical path length and thereby change the phase; a mirror 146 configured to irradiate the sample surface 123 of the sample 122 with the perpendicular polarization component from the drive mirror 144; a wave plate 150 and a polarizing plate 152 configured to adjust the light quantity (adjustment of the intensity, adjustment of the amplitude) of the in-plane polarization component from the polarizing beam splitter 136; a drive mirror 154 comprised of a mirror 154a arranged to change the direction of the in-plane polarization component of the adjusted light quantity and a piezoactuator 154b configured to drive the mirror 154a to change the optical path length and thereby change the phase; a beam expander 156 configured to expand the beam diameter of the in-plane polarization component from the drive mirror 154; a lens 158 configured to convert the in-plane polarization component of the expanded beam diameter eventually to parallel light; a polarizing beam splitter 160 configured to divide light into a transmitted component of in-plane polarization and a reflected component of perpendicular polarization; a wave plate 162 configured to polarize the in-plane polarization component from the polarizing beam splitter 160 to a perpendicular polarization component; an objective lens 164 configured to irradiate the sample surface 123 with the perpendicular polarization component from the wave plate 162; an imaging lens 166 configured to image scattered light of the in-plane polarization component reflected from the sample surface 123 and reflected from the polarizing beam splitter 160; a cooled CCD (charge-coupled device) camera 168 configured to detect a light quantity distribution (light distribution data) of the light imaged by the imaging lens 166; and a computer 170 configured to drive and control the sample stage 121, the wave plates 134 and 150, the polarizing plate 152, the drive mirrors 145 and 155 and the cooled CCD camera 168, and inputting the light distribution data detected by the cooled CCD camera 168 to perform a super-resolution process.

The following specific devices have been employed to constitute the microscopic observation system 110 of the second embodiment:

(1) laser light source 132: CW Blue Laser manufactured by Coherence Inc. (output power: 150 mW, wavelength: 488 nm, polarization: linearly perpendicular (>100:1); and beam diameter: 0.70±0.05 mm);

(2) wave plates 134, 150 and 162: Mounted Zero Order 1/2 Waveplate manufactured by Thorlabs, Inc. (model number: WPH10M-488, Material: Crystal quarts, Diameter: 24.0 mm);

(3) polarizing beam splitter 136: Polarizing Beam Splitter Cubes manufactured by Thorlabs, Inc. (model number: PBS101, material: SF2, Tp:Ts: 1000:1, size: 10 mm×10 mm×10 mm);

(4) polarizing beam splitter 160: Polarizing Beam Splitter Cubes manufactured by Thorlabs, Inc. (model number: PBS251, material: SF2, Tp:Ts: 1000:1, size: 25.4 mm×25.4 mm×25.4 mm);

(5) mirrors 140, 144a and 154a: Dielectric Multi-Layer-Coated Mirror for 45-Degree Incidence manufactured by SIGMA KOKI Co., LTD. (model number: TFM-25C05-500, material: BK7, angle of incidence: 45±3 degrees, diameter: 25 mm);

(6) mirrors 146 and 148: Aluminum-Coated Mirror manufactured by SIGMA KOKI Co., LTD. (model number: TFM-25C05-20, material: BK7, diameter: 25 mm);

(7) beam splitter 142: Non-Polarizing Cube Half Mirror manufactured by SIGMA KOKI Co., LTD. (model number: NPCH-10-4880, material: BK7, size: 10 mm×10 mm×10 mm, R:T: 1:1);

(8) beam expander 156: Laser Beam Expander manufactured by SIGMA KOKI Co., LTD. (model number: BE-21-V, afocal magnification: ×21.0, effective diameter of incidence: 1.7 mm);

(9) objective lens 164: Objective Lens manufactured by Edmund Optics Ltd. (model number: BD Plan Apo SL 20×, BD Plan Apo SL 50×, BD Plan Apo SL 100×, NA: 0.28, 0.42, 0.55, focal length: 10 mm, 4 mm, 2 mm, operating distance: 30.5 mm, 20.0 mm, 13.0 mm);

(10) piezoactuators 144b and 154b: PZT manufactured by Physik Instrumente (model number: P-753.11C, closed loop travel range: 10 μm positioning resolution: Closed loop: 0.1 nm) and PZT Controller manufactured by Physik Instrumente (model number: E-710.4CL, sampling rate (servo): 200 μs/5 kHz, sampling rate (sensor): 50 μs/20 kHz, DAC resolution: 20 bit);

(11) cooled CCD camera 168: Cooled CCD Camera manufactured by BTTRAN (model number: BS-40, pixel size: 8.3 μm×8.3 μm, number of pixels: 772×580, dynamic range: 16 bit, minimum imaging time: 0.001 s, interface: USW; and

(12) sample stage 121: Rotary Stage manufactured by SIGMA KOKI Co., LTD. (model number: KSP-606M, table surface diameter: 60 mm, resolution: 1 degree).

In the microscopic observation system 110 of the second embodiment, laser light (linearly polarized light) from the laser light source 132 has a polarizing direction determined by the wave plate 134 and is divided into an in-plane polarization component and a perpendicular polarization component by the polarizing beam splitter 136. The perpendicular polarization component is entered into the beam splitter 142 by the mirror 140 to be divided. One light component of the division has the angle of incidence adjusted by the mirror 148 and is delivered to the sample surface 123 of the sample 122 from outside (right side in the illustration) of the objective lens 164. The other light component is subjected to adjustment by the drive mirror 144 and the mirror 146 to have the same angle of incidence in the opposite direction (left side in the illustration) of one light component adjusted by the mirror 148, and is delivered to the sample surface 123 of the sample 122 from outside of the objective lens 164. The two light fluxes, i.e., the light from the mirror 146 and the light from the mirror 148 are divisions of the same perpendicularly polarized light and have the same angle of incidence but are delivered to the sample surface 123 from the opposite directions. Accordingly, the sample surface 123 is irradiated with two light-flux, coherent standing wave. This two light-flux, coherent standing wave has the phase adjusted by changing the optical path length of the other light component by the drive mirror 144.

The in-plane polarization component transmitted through the polarizing beam splitter 136, on the other hand, has the light quantity (intensity, amplitude) adjusted by the wave plate 150 and the polarizing plate 152 and is reflected by the drive mirror 155 to enter the beam expander 156. The in-plane polarization component having the beam diameter expanded to about 20 times by the beam expander 156 is adjusted by the lens 158 to be eventually delivered to the sample surface 123 as parallel light and enters the polarizing beam splitter 160. The in-plane polarization component is not reflected at all due to its nature and is fully transmitted through the polarizing beam splitter 160. The in-plane polarization component transmitted through the polarizing beam splitter 160 is polarized to a perpendicular polarization component by the wave plate 162, passes through the objective lens 164 to be converted to parallel light and is delivered to the sample surface 123. Since the two light-flux coherent standing wave from the mirrors 146 and 148 is equivalent to the perpendicular polarization component as described above, such epi-illumination is three light-flux coherent standing wave having high coherence with the two light-flux coherent standing wave. This epi-illumination is accordingly similar to three light-wave illumination consisting of illumination with the planar waves 41 and 51 for generating the standing wave and illumination with the bias planar wave 61 described above in relation to the microscopic observation system 10 of the first embodiment.

With regard to the reflected light and the scattered light from the sample surface 123 irradiated with the three light-flux coherent standing wave, the reflected light and the scattered light derived from the two light-flux coherent standing wave are oblique illumination and are not received by the objective lens 164. The reflected light and the scattered light derived from the epi-illumination, on the other hand, pass through the objective lens 164 and converted into an in-plane polarization component by the wave plate 162. This in-plane polarization component is reflected by the polarizing beam splitter 160 and enters the imaging lens 166 to be imaged on the CCD in the cooled CCD camera 168.

In the microscopic observation system 110 of the second embodiment, the drive mirror 144 serves to change the optical path length and thereby shift the two light-flux coherent standing wave is shifted in nanometer scale, while the drive mirror 154 serves to synchronize the phase of the epi-illumination with a phase change caused by the shift of the two light-flux coherent standing wave. This enables the phase of the three light-flux coherent standing wave to be shifted in nanometer scale. The phase of the three light-flux coherent standing wave is successively shifted by a shift amount in nanometer scale to one wavelength ($2\pi$), and light distribution data is then detected in each shift by the cooled CCD camera 168. This provides light distribution data while successively shifting the phase of the three light-flux coherent standing wave by each shift amount over the entire observation range of the sample surface 123. The sample 122 can be rotated by the sample stage 121. The sample 122 is placed at the center of rotation of the sample stage 121. The phase of the three light-flux coherent standing wave is successively shifted by a shift amount in nanometer scale to one wavelength, and light distribution data is then detected in each shift by the cooled CCD camera 168. The sample 122 is subsequently rotated by 90 degrees. The phase of the three light-flux coherent standing wave is successively shifted again by the shift amount in nanometer scale to one wavelength, and light distribution data is then detected in each shift by the cooled CCD camera 168. This provides light distribution data by irradiating the sample surface 123 with the three light-flux coherent standing wave in the directions orthogonal to the sample surface 123 while successively shifting the phase of the three light-flux coherent standing wave.

Figure 17:
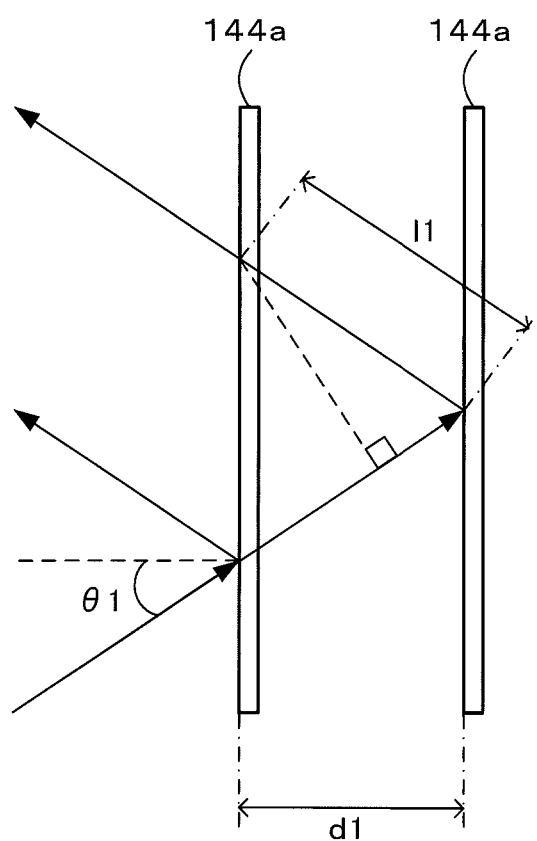
FIG. 17 is a diagram illustrating relationship between phase difference $\xi 1$ and optical path length l.

FIG. 17 is a diagram illustrating the relationship between phase difference $\xi 1$ and optical path length l. An optical path difference l1 is expressed by Equation (9) given below, where d1 represents a travel distance of the mirror 144a of the drive mirror 144 and $\theta 1$ represents an angle of incidence to the mirror 144a. The phase difference $\xi 1$ is expressed by Equation (10), and the travel distance d1 is expressed by Equation (11), where $\lambda$ represents a wavelength. When the drive mirror 144 is driven to shift the phase of the other light component of the two light-flux coherent standing wave by $\xi 1$, the phase of the two light-flux standing wave is shifted by $\xi 1/2$. Accordingly, the phase of the three light-flux coherent standing wave can be shifted by $\xi 1/2$ by shifting the phase of the bias planar wave by $\xi 1/2$. Equations (9) to (11) are also applicable to the bias planar wave by replacing d1, $\xi 1$ and $\theta 1$ with d2, $\xi 2$ and $\theta 2$, where d2 represents a travel distance of the mirror 154a of the drive mirror 154, $\xi 2$ represents a phase difference of the bias planar wave and $\theta 2$ represents an angle of incidence to the mirror 154a. Here $\xi 1=2\xi 2$, so that Equation (10) is rewritten to Equation (12). Solving this Equation (12) for the travel distance d2 gives Equation (13). On the assumption that the angles of incidence $\theta 1$ and $\theta 2$ of the mirrors 144a and 154a are both 45 degrees and the wavelength λ is 488 nm, the travel distances are d1≈172.5·ξ1/π [nm] and d2=d1/2. On the assumption that the phase difference ξ1=2π/n, the travel distance is d1=345/n [nm]. When the phase difference ξ1=π/30 (6 degrees) at n=60, the travel distances are d1=5.75 nm and d2=2.875 nm. The piezoactuators 144b and 154b used in the second embodiment have the positioning resolution of 0.1 nm, so that the phase difference ξ1=π/30 (6 degrees) can be changed with sufficiently high accuracy.

$$l_1 = 2d_1\cos\theta_1 \tag{9}$$

$$\zeta_1 = l_1\frac{2\pi}{\lambda} = \frac{4\pi d_1\cos\theta_1}{\lambda} \tag{10}$$

$$d_1 = \frac{\zeta_1 \cdot \lambda}{4\pi\cos\theta_1} \tag{11}$$

$$\zeta_1 = \frac{4\pi d_1\cos\theta_1}{\lambda} = 2\cdot\frac{4\pi d_2\cos\theta_2}{\lambda} = 2\zeta_2 \tag{12}$$

$$d_2 = \frac{d_1\cos\theta_1}{2\cos\theta_2} \tag{13}$$

Figure 18:
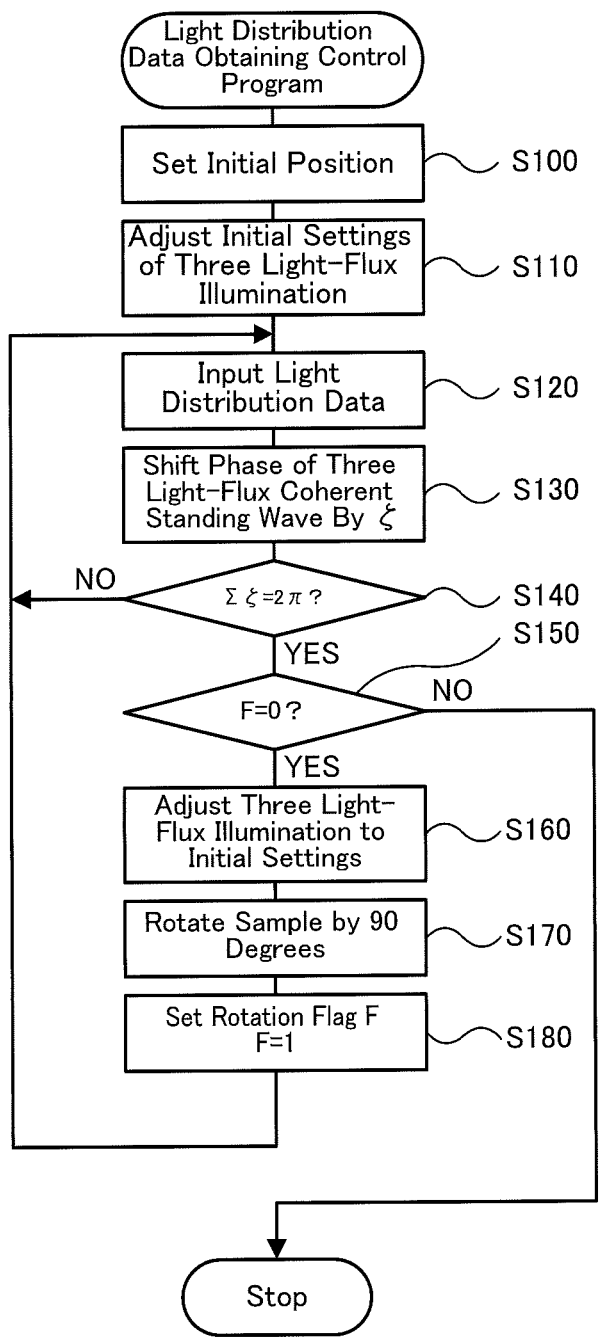
FIG. 18 is a flowchart showing one example of a light distribution data obtaining control program performed by a computer 170.
Figure 19:
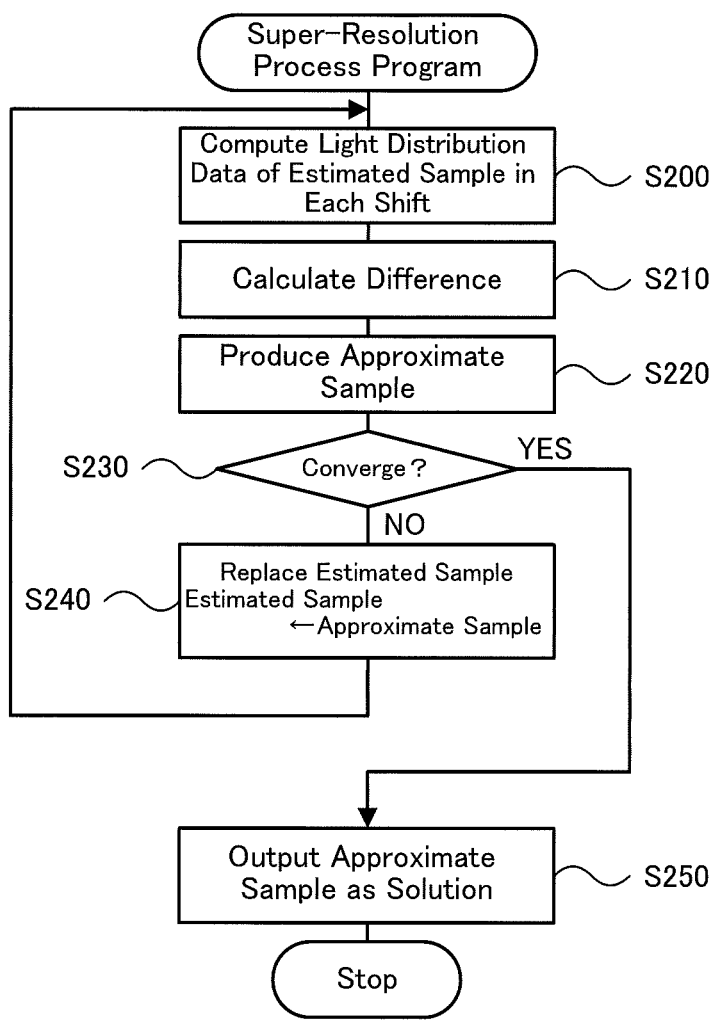
FIG. 19 is a flowchart showing one example of a super-resolution process program performed by the computer 170.
Figure 20:
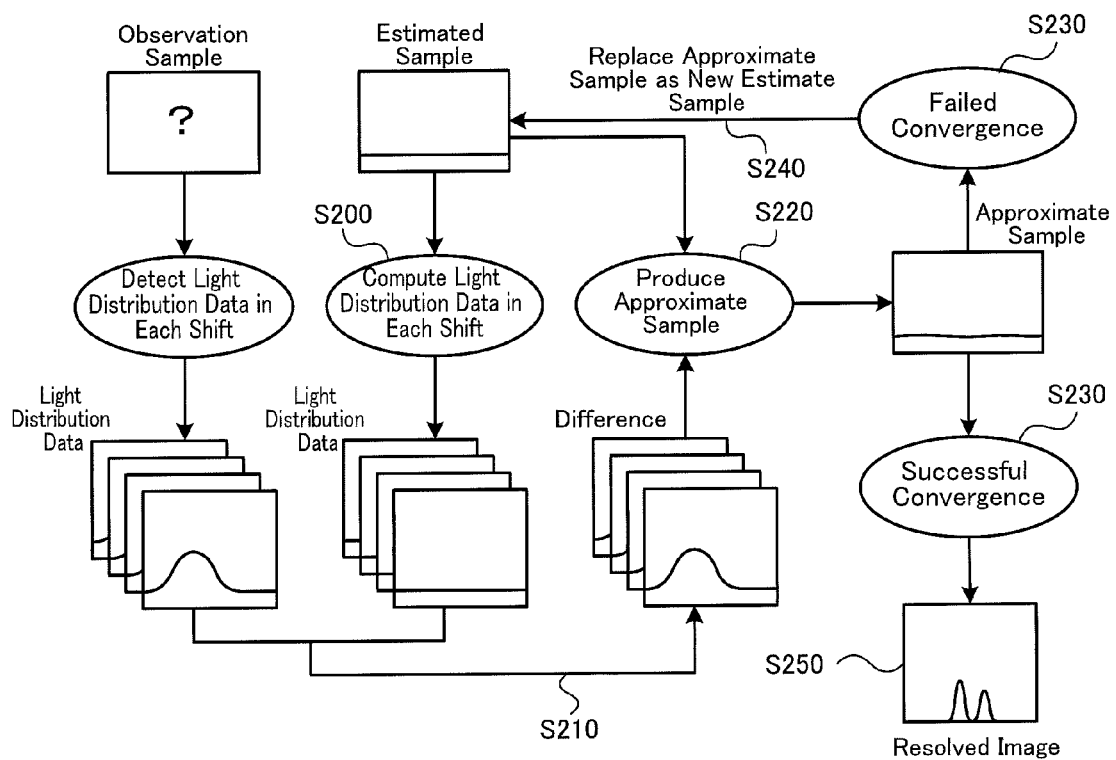
FIG. 20 is a diagram schematically illustrating a process by the super-resolution process program of FIG. 19.

The following describes a procedure of microscopically observing the sample surface 123 in the microscopic observation system 110 of the second embodiment. The microscopic observation system 110 of the second embodiment first performs a light distribution data obtaining control to irradiate the sample surface 123 with the three light-flux coherent standing wave having the successively shifted phase and obtain light distribution data in each shift and subsequently performs a super-resolution process to analyze the obtained light distribution data in each shift by inverse problem analysis. FIG. 18 is a flowchart showing one example of a light distribution data obtaining control program performed by the computer 170. FIG. 19 is a flowchart showing one example of a super-resolution process program performed by the computer 170. FIG. 20 is a diagram schematically illustrating a process by the super-resolution process program of FIG. 19. The following sequentially describes the light distribution data obtaining control and the super-resolution process.

Figure 21:
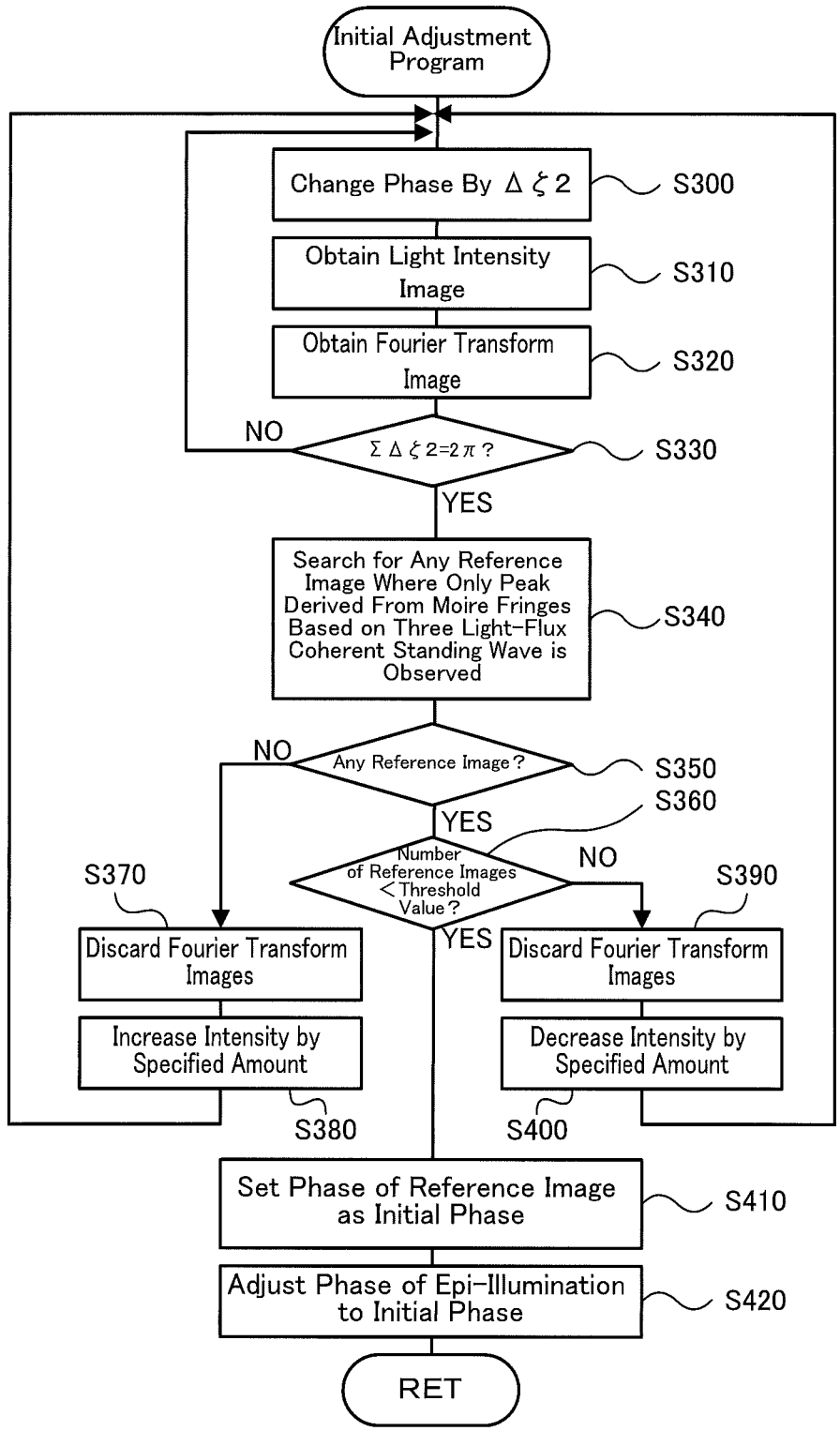
FIG. 21 is a flowchart showing one example of an initial adjustment program.

When being activated, the light distribution data obtaining control program first sets an initial position to adjust the center of the observation range on the sample surface 123 of the sample 122 to the center of rotation of the sample stage 121 (step S100) and adjusts initial settings of the three light-flux coherent standing wave (step S110). The initial settings of the three light-flux coherent standing wave may be adjusted by adjusting the intensity (amplitude) and the phase of the epi-illumination. More specifically, such initial adjustment is performed by executing the initial adjustment program shown in FIG. 21 in the state that a reference sample is irradiated with the two light-flux coherent standing wave. The reference sample is preferably a line-and-space pattern having a periodical structure to produce, in combination with the standing wave, a moire fringe and having a known line pitch.

When being executed, the initial adjustment program first drives the drive mirror 154 to change the phase of the epi-illumination by a phase change amount Δξ2 (step S300), controls the cooled CCD camera 168 to obtain a light intensity image (step S310), obtains a Fourier transform image by Fourier transform of the obtained light intensity image (step S320), and compares a total phase change amount ΣΔξ2 with 2π (step S330). The processing of steps S300 to S330 is repeated until the total phase change amount ΣΔξ2 reaches 2π. For example, when the phase change amount Δξ2 is 6 degrees (π/30) and the angle of incidence θ2 is 45 degrees, the travel distance d2 of the drive mirror 154 is 5.75 nm. The concrete procedure of changing the phase of epi-illumination by the phase change amount Δξ2 drives the piezoactuator 154b of the drive mirror 154 to travel the mirror 154a by 5.75 nm. The process of repeating steps S300 to S330 accordingly obtains Fourier transform images from light intensity images in the respective phases while the phase of epi-illumination is successively changed by each phase change amount Δξ2. Peaks derived from moire fringes based on the two light-flux coherent standing wave having a certain period and peaks derived from moire fringes based on the three light-flux coherent standing wave having a period twice the certain period can be observed in these Fourier transform images when the reference sample is used. When the total phase change amount ΣΔξ2 reaches 2π, the initial adjustment program searches the obtained Fourier transform images for any image where only a peak derived from the moire fringes based on the three light-flux coherent standing wave is observed, as reference images (step S340) and determines whether any reference image is present (step S350). When there is no reference image, the initial adjustment program discards all the obtained Fourier transform images (step S370), drives the wave plate 150 and the polarizing plate 152 by predetermined amounts to increase the intensity (amplitude) of epi-illumination by a specified amount (step S380) and returns to step S300. The specified amount herein is, for example, 1/10, 1/20 or 1/30 of the amplitude of the two light-flux coherent standing wave. When it is determined at step S350 that there is any reference image, on the other hand, the initial adjustment program determines whether the number of detected reference images is less than a threshold value (step S360). When the number of detected reference images is not less than the threshold value, the initial adjustment program discards all the obtained Fourier transform images (step S390), drives the wave plate 150 and the polarizing plate 152 by predetermined amounts to increase the intensity (amplitude) of epi-illumination by a specified amount (step S400) and returns to step S300. The threshold value herein is, for example, a value 2 or a value 3. When there is any reference image and when the number of reference images is less than the threshold value, the initial adjustment program sets the present amplitude as an initial amplitude and the phase in which any reference image is detected as an initial phase (step S410), drives the drive mirror 154 to adjust the phase of epi-illumination to the initial phase (step S420), and is then terminated. The present amplitude is equal to the initial amplitude, so that there is no need to specially adjust the amplitude. Such initial adjustment adjusts the amplitude of epi-illumination to twice the amplitude of the two light-flux coherent standing wave in the acceptable range, while synchronizing the phase of epi-illumination with the phase of the two light-flux coherent standing wave. This accordingly provides the three light-flux coherent standing wave that is effective in the acceptable range of microscopic observation.

The description goes back to the light distribution data obtaining control program. After adjusting the initial settings of the three light-flux coherent standing wave, the light distribution data obtaining control program inputs an intensity (light quantity) distribution (light distribution data) of scattered light imaged by the cooled CCD camera 168 (step S120), shifts the phase of the three light-flux coherent standing wave by a shift amount ξ (step S130), and determines whether a total shift amount Σξ reaches 2π (step S140). The processing of steps S120 to S140 is repeated until the total shift amount Σξ reaches 2π. The shift amount ξ herein is 2π/n when n=for example, 10, 20 or 30. A concrete procedure of shifting the phase of the three light-flux coherent standing wave by the shift amount ξ moves the mirror 144a of the drive mirror 144 by the travel distance d1=172.5·ξ/π [nm], while moving the mirror 154a of the drive mirror 154 by the travel distance d2=d1/2 [nm]. This is based on the following. Shifting the phase of one of the two light fluxes of the two light-flux coherent standing wave (oblique illumination) of the synchronized three light-flux coherent standing light wave by the shift amount ξ causes the phase of the two light-flux coherent standing wave to be shifted by ξ/2. Shifting the phase of the third light flux, i.e., the bias planar wave (epi-illumination) by ξ/2 enables the bias planar wave to be synchronized with the two light-flux coherent standing wave of the shifted phase. This is described in detail below.

When electric field components E1 and E2 in the z-axis direction of the two light fluxes are respectively expressed by Equations (14) and (15) given below, a total electric field component E1+E2 is equivalent to a standing wave expressed by Equation (16). An electric field component E3 of the bias planar wave is expressed by Equation (17). When the phases ξ1 and ξ2 are neglected for simplicity, a total electric field component E1+E2+E3 is expressed by Equation (18). The conditions that enables the two light-flux standing wave to be ideally synchronized with the bias planar wave are 2a=b and ξ3=0, π. Herein 2a=b means that the amplitude of the two light-flux coherent standing wave is equal to the amplitude of the bias planar wave and also means that twice the amplitude of the two light-flux planar waves constituting the two light-flux coherent standing wave is equal to the amplitude of the bias planar wave. The ideally synchronized three light-flux standing wave is expressed by Equation (19).

$$E_1(x, y, t) = a \cdot \sin(k \cdot \sin\theta \cdot x - k \cdot \cos\theta \cdot y + \omega \cdot t + \zeta_1) \quad (14)$$

$$E_2(x, y, t) = a \cdot \sin(-k \cdot \sin\theta \cdot x - k \cdot \cos\theta \cdot y + \omega \cdot t + \zeta_2) \quad (15)$$

$$E_1 + E_2 = \quad (16)$$
$$2a \cdot \sin\left(-k \cdot \cos\theta \cdot y + \omega \cdot t + \frac{\zeta_1 + \zeta_2}{2}\right)\cos\left(k \cdot \sin\theta \cdot x - \frac{\zeta_1 - \zeta_2}{2}\right)$$

$$E_3(y, t) = b \cdot \sin(-k \cdot \cos\theta \cdot y + \omega \cdot t + \zeta_3) \quad (17)$$

$$E_1 + E_2 + E_3 = 2a \cdot \cos(k \cdot \sin\theta \cdot x)\sin(-k \cdot \cos\theta \cdot y + \omega \cdot t) + \quad (18)$$
$$b \cdot \sin(-k \cdot \cos\theta \cdot y + \omega \cdot t + \zeta_3)$$

$$E_1 + E_2 + E_3 = 2a(\cos(k \cdot \sin\theta \cdot x) + 1)\sin(-k \cdot \cos\theta \cdot y + \omega \cdot t) \text{ or} \quad (19)$$
$$2a(\cos(k \cdot \sin\theta \cdot x) - 1)\sin(-k \cdot \cos\theta \cdot y + \omega \cdot t)$$

The total electric field component E1+E2+E3 is expressed by Equation (20) by taking into account the phases ξ1 and ξ2. By replacing the phases ξ1 and ξ3 respectively with ξ1+Δξ1 and ξ3+Δξ1/2 to shift the standing wave, Equation (20) is rewritten to Equation (21) on the assumption that 2a=b and all the phases ξ1, ξ2, and ξ3 are synchronized to be the value 0. In Equation (21), the x-axis term and the time term are separated from each other, so that the standing wave is kept even when the phase is shifted. In other words, the phase of the three light-flux coherent standing wave can be shifted by providing half the phase shift of oblique illumination to the phase shift of epi-illumination.

$$(20)$$
$$E_1 + E_2 + E_3 =$$
$$2a \cdot \sin\left(-k \cdot \cos\theta \cdot y + \omega \cdot t + \frac{\zeta_1 + \zeta_2}{2}\right)\cos\left(k \cdot \sin\theta \cdot x - \frac{\zeta_1 - \zeta_2}{2}\right) +$$
$$b \cdot \sin(-k \cdot \cos\theta \cdot y + \omega \cdot t + \zeta_3)$$

-continued $$(21)$$
$$E_1 + E_2 + E_3 = 2a\sin\left(-k \cdot \cos\theta \cdot y + \omega \cdot t + \frac{\Delta\zeta_1}{2}\right)$$
$$\cos\left(k \cdot \sin\theta \cdot x - \frac{\Delta\zeta_1}{2}\right) + 2a\sin\left(-k \cdot \cos\theta \cdot y + \omega \cdot t + \frac{\Delta\zeta_1}{2}\right)$$
$$= 2a\sin\left(-k \cdot \cos\theta \cdot y + \omega \cdot t + \frac{\Delta\zeta_1}{2}\right)$$
$$\left(\cos\left(k \cdot \sin\theta \cdot x - \frac{\Delta\zeta_1}{2}\right) + 1\right)$$

The following describes the phase shift by taking into account interference of the reflected light wave as well as interference of incident light wave. Reflected light waves Er1, Er2 and Er3 of the electric field components E1, E2 and E3 in the z-axis direction of the three light fluxes are respectively expressed by Equations (22), (23) and (24) given below, where r1, r2 and r3 represent reflectivities. In the case of addition of these three light waves, the three light-flux coherent standing wave can be generated by correcting the intensity and the phase of epi-illumination. The three light-flux coherent standing wave can be shifted by shifting the phase of one light flux of oblique illumination and providing half the phase shift to epi-illumination. Since the two light fluxes of oblique illumination have the same angle of incidence, r1=r2, ξ4=ξ1+ξ7 and ξ5=ξ2+ξ7. When y=0, the two light-flux coherent standing wave is expressed by Equation (25) and the epi-illumination is expressed by Equation (26). Adjusting the amplitude (intensity) and the phase of epi-illumination to satisfy Equation (27) from Equations (25) and (26) provides the three light-flux coherent standing wave expressed by Equation (28). B in Equation (25) of the two light-flux coherent standing wave is changed by ξ/2 by shifting the phase of one of the planar waves of oblique illumination is shifted by ξ. D in Equation (26) is changed by ξ/2, on the other hand, by shifting the phase of epi-illumination by ξ/2. This enables the standing wave to be shifted, while maintaining the equality of Equation (27). As described above, even when interference of the reflected light wave as well as interference of incident light wave are taken into account, the phase of the three light-flux coherent standing wave can be shifted with maintaining the synchronism by shifting the phase of one of the planar waves of oblique illumination (two light-flux coherent standing wave) of the synchronized three light-flux coherent standing wave by the shift amount ξ and synchronously shifting the phase of epi-illumination (bias planar wave) by the shift amount ξ/2.

$$E_{r1}(x, y, t) = r_1 \cdot a \cdot \sin(k \cdot \sin\theta \cdot x + k \cdot \cos\theta \cdot y + \omega \cdot t + \zeta_4) \quad (22)$$

$$E_{r2}(x, y, t) = r_2 \cdot a \cdot \sin(-k \cdot \sin\theta \cdot x + k \cdot \cos\theta \cdot y + \omega \cdot t + \zeta_5) \quad (23)$$

$$E_{r3}(y, t) = r_3 \cdot b \cdot \sin(k \cdot \cos\theta \cdot y + \omega \cdot t + \zeta_6) \quad (24)$$

$$E_1 + E_2 + E_{r1} + E_{r2} = 2a \cdot \left(\sin\left(\omega \cdot t + \frac{\zeta_1 + \zeta_2}{2}\right) + r_1 \cdot \sin(\omega \cdot t + \quad (25)\right.$$
$$\left.\frac{\zeta_1 + \zeta_2 + 2\zeta_7}{2}\right)\right)\cos\left(k \cdot \sin\theta \cdot x - \frac{\zeta_1 - \zeta_2}{2}\right)$$
$$= 2a \cdot (A \cdot \sin(\omega \cdot t + B))\cos\left(k \cdot \sin\theta \cdot x - \frac{\zeta_1 - \zeta_2}{2}\right)$$

$$E_3 + E_{r3} = b \cdot \sin(\omega \cdot t + \zeta_3) + r_3 \cdot b \cdot \sin(\omega \cdot t + \zeta_6) \quad (26)$$
$$= b \cdot (C \cdot \sin(\omega \cdot t + D))$$

$$2a \cdot (A \cdot \sin(\omega \cdot t + B)) = b \cdot (C \cdot \sin(\omega \cdot t + D)) \quad (27)$$

-continued $$E_1 + E_2 + E_3 + E_{r1} + E_{r2} + E_{r3} = \quad (28)$$
$$2a \cdot (A \cdot \sin(\omega \cdot t + B)) \left( \cos\left(k \cdot \sin\theta \cdot x - \frac{\zeta_1 - \zeta_2}{2}\right) + 1 \right)$$

The description again goes back to the light distribution data obtaining control program. After repeating the processing of steps S120 to S140 until the total shift amount $\Sigma\xi$ reaches $2\pi$, the light distribution data obtaining control program checks the setting of a rotation flag F (step S150). The rotation flag F is set to a value 0 as the initial value and is set to a value 1 at step S180 described below when the sample stage 121 is rotated by 90 degrees after repetition of the processing of steps S120 to S140. When the rotation flag F is equal to the value 0, the program uses the initial settings adjusted at step S110 to adjust the three light-flux coherent standing wave to the initial settings (step S160), rotates the sample stage 121 by 90 degrees (step S170), sets the rotation flag F to the value 1 (step S180) and returns to step S120. The program goes back to step S120 after rotating the sample stage 121 by 90 degrees, in order to relatively rotate the three light-flux coherent standing wave delivered to the sample surface 123 by 90 degrees and again shift the phase of the three light-flux coherent standing wave by the shift amount $\xi$. This irradiates the sample surface 123 with the three light-flux coherent standing wave in two directions orthogonal to the sample surface 123 and obtains the light distributions while successively shifting the phase of the three light-flux coherent standing wave.

After rotation of the sample stage 121 by 90 degrees, the program successively shifts the phase of the three light-flux coherent standing wave by each shift amount and obtains light distribution data. When the total shift amount $\Sigma\xi$ reaches $2\pi$, a negative answer is given at step S150 and this program is terminated.

The following describes the super-resolution process. When being activated, the super-resolution process program of FIG. 19 first computes light distribution data in each shift of an estimated sample having known structure (step S200). The estimated sample may be any sample having known structure: for example, a sample having an ideal structure in accordance with designed values of the sample surface 123 or a sample having a uniform (entirely flat) structure when the structure of the sample surface 123 is totally unknown. The light distribution data in each shift of the estimated sample is computed from the shift amount $\xi$ used in the light distribution data obtaining control program. The super-resolution process program subsequently calculates a difference between the light distribution data in each shift of the sample surface 123 and the light distribution data in each shift of the estimated sample (step S210), modifies the estimated sample to compensate for the difference and thereby produce an approximate sample (step S220) and determines whether the difference converges (step S230). The amount of modification of the estimated sample may be a predefined small amount or may be a value obtained by multiplying the magnitude of the difference by a gain. An applicable technique to determine whether the difference converges may compare the difference with a reference value specified in advance as a value suitable for determining convergence of the difference and determine the convergence of the difference when the difference becomes equal to or less than the reference value. Another applicable technique may determine the convergence of the difference when the processing of steps S200 to S230 is repeated a predefined number of times (for example, 100 times, 1000 times or 10000 times). When it is determined that the difference does not converge, the program replaces the approximate sample as the new estimated sample (step S240) and goes back to step S200 to calculate the light distribution data in each shift of the replaced estimated sample. Repeating the processing of steps S200 to S230 gradually approaches the approximate sample to the sample surface 123. When it is determined at step S230 that the difference converges, the program outputs the present approximate sample as a solution (i.e., resolution of the sample surface 123) (step S250) and is then terminated.

The microscopic observation system 110 of the second embodiment described above has the similar advantageous effects to those of the lighting device 20 in the microscopic observation system 10 of the first embodiment. More specifically, addition of epi-illumination allows for the periodic appearance of an electric field distribution just raised to have only the positive distribution or only the negative distribution (i.e., just raised not to range from the positive to the negative) from the electric field distribution ranging from the positive to the negative on the sample surface 123.

In the microscopic observation system 110 of the second embodiment, the drive mirror 144 serves to change the optical path length of the other light component for generating the two light-flux coherent standing wave by an amount corresponding to the travel distance d1 and thereby shift the phase of the two light-flux coherent standing wave. The drive mirror 154 serves to change the optical path length of epi-illumination by an amount corresponding to the travel distance d2=d1/2 in synchronism with the phase shift of the two light-flux coherent standing wave and thereby synchronize the phase of epi-illumination with the phase change of the two light-flux coherent standing wave. Light distribution data are detected, while the phase of the three light-flux coherent standing wave delivered to the sample surface 123 is successively shifted by each shift amount $\xi$. In addition to detection of such light distribution data, the sample stage 121 is driven to rotate the sample 122 by 90 degrees, and light distribution data are further detected while the phase of the three light-flux coherent standing wave delivered to the sample surface 123 is successively shifted by each shift amount $\xi$. This readily irradiates the sample surface 123 with the three light-flux coherent standing wave in the directions orthogonal to the sample surface 123 and obtains light distributions while successively shifting the phase of the three light-flux coherent standing wave.

In the microscopic observation system 110 of the second embodiment, the phase of epi-illumination is successively changed by each phase change amount $\Delta\xi2$ until the phase of epi-illumination reaches $2\pi$, and light intensity images are obtained by the cooled CCD camera 168. Fourier transform images obtained by Fourier transform of the obtained light intensity images are searched for any image where only a peak derived from the moire fringe based on the three light-flux coherent standing wave is observed, as reference images. When there is no reference image, the wave plate 150 and the polarizing plate 152 are driven to increase the intensity (amplitude) of epi-illumination by a specified amount. When the number of reference images is not less than the threshold value, the wave plate 150 and the polarizing plate 152 are driven to decrease the intensity (amplitude) of epi-illumination by a specified amount. This series of processing is repeated until the number of reference images becomes less than the threshold value. The amplitude when the number of reference images becomes less than the threshold value is set to the initial amplitude of epi-illumination. The phase of the reference image when the number of reference images becomes less than the threshold value is set to the initial phase of epi-illumination. This adjusts the amplitude of epi-illumination to twice the amplitude of the two light-flux coherent standing wave, while synchronizing the phase of epi-illumination with the phase of the two light-flux coherent standing wave. This provides the three light-flux coherent standing wave that is effective in the acceptable range of microscopic observation.

The microscopic observation system 110 of the second embodiment have employed CW Blue Laser manufactured by Coherence Inc. as the laser light source 132, Mounted Zero Order 1/2 Waveplate manufactured by Thorlabs, Inc. as the wave plates 134, 150 and 162, Polarizing Beam Splitter Cubes manufactured by Thorlabs, Inc. as the polarizing beam splitter 136, Polarizing Beam Splitter Cubes manufactured by Thorlabs, Inc. as the polarizing beam splitter 160, Dielectric Multi-Layer-Coated Mirror for 45-Degree Incidence manufactured by SIGMA KOKI Co., LTD. as the mirrors 140, 144a and 154a, Aluminum-Coated Mirror manufactured by SIGMA KOKI Co., LTD. as the mirrors 146 and 148, Non-Polarizing Cube Half Mirror manufactured by SIGMA KOKI Co., LTD. as the beam splitter 142, Laser Beam Expander manufactured by SIGMA KOKI Co., LTD. as the beam expander 156, Objective Lens manufactured by Edmund Optics Ltd. as the objective lens 164, PZT manufactured by Physik Instrumente and PZT Controller manufactured by Physik Instrumente as the piezoactuators 144b and 154b, Cooled CCD Camera manufactured by BITRAN as the cooled CCD camera 168 and Rotary Stage manufactured by SIGMA KOKI Co., LTD. as the sample stage 121. These devices are, however, not restrictive but any devices having the equivalent or higher performances may be employed for the same purposes.

The aspect of the invention is described above with reference to the embodiment. The invention is, however, not limited to the above embodiment but various modifications and variations may be made to the embodiment without departing from the scope of the invention.

INDUSTRIAL APPLICABILITY

The present invention is applicable to, for example, the manufacturing industries of lighting device and microscopic observation device.

The invention claimed is:

1. A lighting method employed for a microscopic observation device configured to resolve a sample surface of a sample to be microscopically observed, based on a light intensity distribution from the sample surface, the lighting method comprising:
irradiating the sample surface with two light-flux standing wave obtained by radiating two light-flux planar waves, which are produced from light emitted from a light source assembly, from oblique directions to be opposed to each other, while irradiating the sample surface with a bias planar wave obtained by adjusting amplitude and phase of one light-flux planar wave, which is produced from the light emitted from the light source assembly, from a direction normal to the sample surface, so as to irradiate the sample surface with three light-flux standing wave.

2. The lighting method according to claim 1,
wherein the bias planar wave is a planar wave having a phase adjusted to alternately oscillate to positive and to negative with an equal electric field displacement irrespective of position on the sample surface across a reference time specified in advance as a time when an electric field displacement of the two light-flux standing wave has a value "0" at respective positions on the sample surface, and an amplitude adjusted to raise an electric field displacement of another light wave group present on the sample surface to only a positive displacement or to only a negative displacement.

3. The lighting method according to claim 1,
wherein the bias planar wave has an amplitude adjusted to be equal to amplitude of the two light-flux standing wave, and a phase adjusted to be synchronized with phase of the two light-flux standing wave.

4. The lighting method according to claim 1,
the lighting method further comprising:
repeating a series of processes until number of reference images becomes less than a threshold value, wherein the series of processes include: a process of irradiating the sample surface with the two light-flux standing wave while successively shifting phase of the bias planar wave by each predefined amount until the phase of the bias planar wave reaches $2\pi$, and obtaining a light distribution in each shift which is an intensity distribution of light reflected or scattered from the sample surface; a process of searching Fourier transform images obtained by Fourier transform of the light distributions in the respective shifts, for any reference image where only a peak derived from a moire fringe based on the three light-flux standing wave is observed, wherein the peak derived from the moire fringe based on the three light-flux standing wave has a period that is twice a period of a peak derived from a moire fringe based on the two light-flux standing wave; and a process of increasing amplitude of the bias planar wave when there is no reference image, while decreasing the amplitude of the bias planar wave when the number of the reference images is not less than the threshold value; and setting an amplitude when the number of the reference images becomes less than the threshold value, as an initial amplitude of the bias planar wave, and a phase of the reference image when the number of the reference images becomes less than the threshold value, as an initial phase of the bias planar wave, so as to adjust the three light-flux standing wave which is to be delivered to the sample surface.

5. The lighting method according to claim 1,
the lighting method further comprising:
successively shifting phase of the two light-flux standing wave in synchronism with phase of the bias planar wave, so as to successively shift phase of the three light-flux standing wave.

6. The lighting method according to claim 5,
the lighting method further comprising:
successively shifting phase of one of the planar waves of the two light-flux standing wave by a predetermined phase, while successively shifting phase of the bias planar wave by half the predetermined phase, so as to successively shift the phase of the three light-flux standing wave.

7. The lighting method according to claim 6,
the lighting method further comprising:
successively changing optical path length of one of the planar waves of the two light-flux standing wave by a predetermined distance, while successively changing optical path length of the bias planar wave by half the predetermined distance, so as to successively shift the phase of the three light-flux standing wave.

8. A microscopic observation device configured to resolve a sample surface of a sample to be microscopically observed, based on a light intensity distribution from the sample surface, the microscopic observation device comprising:
a light source assembly;
a lighting device having: a two light-flux standing wave illumination unit configured to irradiate the sample surface with two light-flux standing wave obtained by radiating two light-flux planar waves, which are produced from light emitted from a light source assembly, from oblique directions to be opposed to each other; and a bias planar wave illumination unit configured to irradiate the sample surface with a bias planar wave obtained by adjusting amplitude and phase of one light-flux planar wave, which is produced from the light emitted from the light source assembly, from a direction normal to the sample surface, the lighting device being configured to irradiate the sample surface with three light-flux standing wave consisting of the two light-flux standing wave and the bias planar wave;
a light distribution acquirer configured to obtain an intensity distribution of light reflected and/or scattered from the sample surface irradiated with the three light-flux standing wave, as a light distribution;
a shift controller configured to control the lighting device to successively shift phase of the three light-flux standing wave, and to control the light distribution acquirer to obtain the light distribution in each shift of the phase of the three light-flux standing wave; and
a resolver configured to perform a super-resolution process for the light distribution obtained in each shift of the phase of the three light-flux standing wave, so as to resolve the sample surface.

9. The microscopic observation device according to claim 8,
wherein the bias planar wave illumination unit is configured to adjust phase of the bias planar wave to alternately oscillate to positive and to negative with an equal electric field displacement irrespective of position on the sample surface across a reference time specified in advance as a time when an electric field displacement of the two light-flux standing wave has a value "0" at respective positions on the sample surface, and to adjust amplitude of the bias planar wave to raise an electric field displacement of another light wave group present on the sample surface to only a positive displacement or to only a negative displacement.

10. The microscopic observation device according to claim 9,
wherein the two light-flux standing wave illumination unit is configured to radiate the two light-flux planar waves satisfying relationships expressed by Equation (1) and Equation (2) given below, and
the bias planar wave illumination unit is configured to radiate the bias planar wave satisfying a relationship expressed by Equation (3) given below, $$E1 = A \cdot \sin(-\omega \cdot t + k \cdot \sin \theta \cdot x - k \cdot \cos \theta \cdot y) \quad (1)$$

$$E2 = A \cdot \sin(-\omega \cdot t - k \cdot \sin \theta \cdot x - k \cdot \cos \theta \cdot y) \quad (2)$$

$$E3 = 2 \cdot A \cdot \sin(-\omega \cdot t - k \cdot y) \quad (3)$$

where E1 and E2 represent electric fields of the respective two light-flux planar waves, E3 represents an electric field of the bias planar wave, A represents an amplitude of each of the two light-flux standing wave, the amplitude of the bias planar wave is equal to an amplitude of the two light-flux standing wave, k represents a wave number of each of the two light-flux planar waves and the bias planar wave, θ represents an angle of incidence of the two light-flux planar waves to the sample surface, x represents a position in a direction of intersection between planes of incidence of the two light-flux planar waves and the sample surface, y represents a position in the direction normal to the sample surface, ω represents an angular frequency and t represents a time.

11. The microscopic observation device according to claim 10,
wherein the bias planar wave illumination unit radiates the bias planar wave satisfying a relationship expressed by Equation (7) of a corrected electric field E3a, which is obtained by correcting the electric field E3 using a corrected amplitude P and a phase correction amount ΔD based on relationships expressed by Equations (4) to (6) given below, $$E1r = r1 \cdot A \cdot \sin(-\omega \cdot t + k \cdot \sin \theta \cdot x + k \cdot \cos \theta \cdot y + \delta1) \quad (4)$$

$$E2r = r2 \cdot A \cdot \sin(-\omega \cdot t - k \cdot \sin \theta \cdot x + k \cdot \cos \theta \cdot y + \delta2) \quad (5)$$

$$E3r = P \cdot r3 \cdot \sin(-\omega \cdot t + k \cdot y + \Delta + \delta3) \quad (6)$$

$$E3a = P \cdot \sin(-\omega \cdot t + k \cdot y + \Delta D) \quad (7)$$

where E1r and E2r represent electric fields of respective reflected light waves by reflection of the two light-wave planar waves from the sample surface, r1 and r2 represent reflectivities of the two light-wave planar waves from the sample surface, δ1 and δ2 represent phase differences between the two light-wave planar waves and the respective reflected light waves by reflection of the two light-wave planar waves from the sample surface, E3r represents an electric field of a reflected light wave by reflection of the bias planar wave from the sample surface, r3 represents a reflectivity of the bias planar wave from the sample surface, δ3 represents a phase difference between the bias planar wave and the reflected light wave by reflection of the bias planar wave from the sample surface, P represents a corrected amplitude by correcting the amplitude of the bias planar wave assumed to be equal to amplitude of the two-light flux standing wave, and ΔD represents a phase correction amount by correcting the phase of the bias planar wave.

12. The microscopic observation device according to claim 9,
wherein the bias planar wave illumination unit radiates the bias planar wave using the reference time and the amplitude based on electric field displacements of reflective light waves of the two light-flux planar waves and the bias planar wave from the sample surface.

13. The microscopic observation device according to claim 8,
wherein the bias planar wave illumination unit is configured to radiate the bias planar wave having an amplitude adjusted to be equal to amplitude of the two light-flux standing wave and a phase adjusted to be synchronized with phase of the two light-flux standing wave.

14. The microscopic observation device according to claim 8, further comprising:
an initial setting unit configured to repeat three controls until number of reference images becomes less than a threshold value and set an amplitude when the number of the reference images becomes less than the threshold value, as an initial amplitude of the bias planar wave, and a phase of the reference image when the number of the reference images becomes less than the threshold value, as an initial phase of the bias planar wave, wherein the three controls include: a bias planar wave phase shift control of controlling the illumination device to irradiate the sample surface with the two light-flux standing wave by the two light-flux standing wave illumination unit while successively shifting phase of the bias planar wave by each predetermined amount until the phase of the bias planar wave reaches $2\pi$; a light distribution-in-each-shift obtaining control of controlling the light distribution acquirer to obtain the light distribution in each shift of the phase of the bias planar wave by the predetermined amount; and an amplitude adjustment control of controlling the lighting device to search Fourier transform images obtained by Fourier transform of the light distributions in the respective shifts, for any reference image where only a peak derived from a moire fringe based on the three light-flux standing wave is observed, wherein the peak derived from the moire fringe based on the three light-flux standing wave has a period that is twice a period of a peak derived from a moire fringe based on the two light-flux standing wave, and to increase amplitude of the bias planar wave when there is no reference image, while decreasing the amplitude of the bias planar wave when the number of the reference images is not less than the threshold value.

15. The microscopic observation device according to claim 14,
wherein the shift controller is configured to control the lighting device to successively shift phase of the two light-flux standing wave in synchronism with phase of the bias planar wave, so as to successively shift the phase of the three light-flux standing wave.

16. The microscopic observation device according to claim 15,
wherein the shift controller is configured to control the lighting device to successively shift phase of one of the planar waves of the two light-flux standing wave by a predetermined phase, while successively shifting phase of the bias planar wave by half the predetermined phase, so as to successively shift the phase of the three light-flux standing wave.

17. The microscopic observation device according to claim 16,
wherein the shift controller is configured to control the lighting device to successively change optical path length of one of the planar waves of the two light-flux standing wave by a predetermined distance, while successively changing optical path length of the bias planar wave by half the predetermined distance, so as to successively shift the phase of the three light-flux standing wave.

18. The microscopic observation device according to claim 15, further comprising:
a rotary stage configured to place the sample thereon and rotate the sample about an axis of rotation which is the direction normal to the sample surface, wherein
the shift controller is configured to control the rotary stage to rotate the sample surface by 90 degrees, to control the lighting device to successively shift the phase of the three light-flux standing wave before and after rotation of the sample surface by 90 degrees, and to control the light distribution acquirer to obtain the light distribution in each shift of the phase of the three light-flux standing wave.

* * * * *